US007006173B1

(12) United States Patent
Hiyama et al.

(10) Patent No.: US 7,006,173 B1

(45) Date of Patent: Feb. 28, 2006

(54) LIQUID CRYSTAL DISPLAY DEVICE HAVING PARTICULAR REFLECTIVE POLARIZER

(75) Inventors: Ikuo Hiyama, Hitachi (JP); Makoto Tsumura, Hitachi (JP); Masaya Adachi, Hitachi (JP); Katsumi Kondo, Mito (JP); Jun-ichi Hirakata, Chiba (JP); Yuji Mori, Urizura-machi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/270,780

(22) Filed: Mar. 17, 1999

(30) Foreign Application Priority Data

Mar. 18, 1998 (JP) ................................ 10-068128

(51) Int. Cl.
*G02F 1/1335* (2006.01)

(52) U.S. Cl. .............................. 349/96; 349/9; 349/61

(58) Field of Classification Search .................. 349/96, 349/61–65, 9

See application file for complete search history.

(56) References Cited

U.S. PATENT DOCUMENTS

| | | | | |
|---|---|---|---|---|
| 2,378,252 A | | 6/1945 | Staehle et al. | |
| 5,235,443 A | | 8/1993 | Barnik et al. | |
| 5,486,949 A | | 1/1996 | Schrenk et al. | |
| 5,555,114 A | | 9/1996 | Narita et al. | |
| 5,587,816 A | * | 12/1996 | Gunjima et al. | 349/62 |
| 5,686,979 A | * | 11/1997 | Weber et al. | 349/96 |
| 5,712,694 A | * | 1/1998 | Taira et al. | 349/9 |
| 5,721,603 A | | 2/1998 | De Vaan et al. | |
| 5,751,388 A | * | 5/1998 | Larson | 349/96 |
| 5,808,794 A | * | 9/1998 | Weber et al. | 359/487 |

(Continued)

FOREIGN PATENT DOCUMENTS

| | | |
|---|---|---|
| JP | 3-45906 | 2/1991 |

(Continued)

OTHER PUBLICATIONS

D. Broer et al., "Reflective Cholesteric Polariser Improving the Light Yield of Back-and Side-Lighted Flat Panel Liquid Crystal Displays", *Proceedings of the Fifteenth International Display Research Conference* (*Asia Display '95*), ACT CITY Hamamatsu, Hamamatsu, Japan, Oct. 16-18, 1995, pp. 735-738.

(Continued)

*Primary Examiner*—Robert Kim
*Assistant Examiner*—Mike Qi
(74) *Attorney, Agent, or Firm*—Antonelli, Terry, Stout and Kraus, LLP.

(57) ABSTRACT

In order to realize liquid crystal display devices having a wide viewing angle and reduce the absorption loss by polarizers and color filters, and arrangement of reflective color selective means, reflective polarizing selective means, a light control element, and others are specified. The liquid crystal display device able to produce a display of high performance and improved brightness is formed of liquid crystal display elements 20 for controlling polarizing light so that the major axis direction of a pixel is arranged approximately in parallel with a direction wherein the linearly polarized light component of the projected light projected from said illumination device is high; an illumination device 50 arranged at a rear plane of the liquid crystal display element; a reflector 54 arranged at a rear plane of the illumination device; light control elements 40 and reflective polarizing selective means 30 arranged between the liquid crystal display element and the illumination device; and a screen arranged at an opposite side relative to the illumination device of the liquid crystal display element.

16 Claims, 19 Drawing Sheets

U.S. PATENT DOCUMENTS

| | | | | | |
|---|---|---|---|---|---|
| 5,828,488 | A | * | 10/1998 | Ouderkirk et al. | 359/487 |
| 5,986,723 | A | * | 11/1999 | Nakamura et al. | 349/39 |
| 6,020,944 | A | * | 2/2000 | Hoshi | 349/62 |
| 6,025,897 | A | * | 2/2000 | Weber et al. | 349/96 |
| 6,101,032 | A | * | 8/2000 | Wortman et al. | 359/500 |
| 6,104,454 | A | * | 8/2000 | Hiyama et al. | 349/65 |
| 6,147,725 | A | * | 11/2000 | Yuuki et al. | 349/65 |
| 6,252,710 | B1 | * | 6/2001 | Fan et al. | 359/495 |
| 6,323,918 | B1 | * | 11/2001 | Yoshioka et al. | 349/48 |

FOREIGN PATENT DOCUMENTS

| | | |
|---|---|---|
| JP | 6-130424 | 5/1994 |
| JP | 6-167718 | 6/1994 |
| JP | 6-324333 | 11/1994 |
| JP | 7-36032 | 2/1995 |
| WO | 95/01584 | 1/1995 |
| WO | 95/27919 | 10/1995 |

OTHER PUBLICATIONS

M. Weber, "Retroreflecting Sheet Polarizer", *Society of Information Display International Symposium Digest of Technical Papers, vol. XXIII* (*SID 92 Digest*), Hynes Convention Center, Boston, MA, May 17-22, 1992, pp. 427-429.

* cited by examiner

LIQUID CRYSTAL DISPLAY DEVICE HAVING PARTICULAR REFLECTIVE POLARIZER

BACKGROUND OF THE INVENTION

The present invention relates to a liquid crystal display device, and, more particularly, to a liquid crystal display device having a viewing angle which is widened and a light utilization efficiency which is improved by re-utilization of light using polarizing conversion and polarizing wave length selectivity.

Currently, the technical advancement in liquid crystal display devices, particularly in color liquid crystal display devices, is significant, such that display devices having almost the same image quality as a CRT have been realized. The liquid crystal display device has experienced an enlarged commercial market based on such features as thinness, lightness in weight, and low power consumption. However, the liquid crystal display itself is still inferior to a CRT in display performance, such as a moving image display, viewing angle, and color reproduction. Therefore, the liquid crystal display device still has areas of its display performance which require improvement, as well as for its production cost to be reduced.

The direct view type color liquid crystal display devices which are available on the present market can be divided roughly into two types, i.e. an active matrix driven liquid crystal display device using TFT (thin film transistor) and a multiplex driven STN (super twisted nematic) liquid crystal display device. In both of these display devices, polarizers are arranged at both sides of an element, which is composed of a liquid crystal layer held by glass substrates, and a display is produced by modulating the polarization of linearly polarized light.

In the liquid crystal display device using the TFT, a TN (twisted nematic) mode is a representative mode of operation. However, both of the TN and STN modes have a narrow viewing angle, and other problems, such as image reversal in a grayscale display and a multicolor display, and a decrease in contrast ratio.

As a way of widening the viewing angle using the TFT, various viewing angle widening modes, such as a VAN (vertical aligned nematic) mode, an IPS (in-plane switching) mode, and others, are used. In the above VAN and IPS modes for widening the viewing angle, grayscale reversal depending on viewing angle is scarcely generated, but color shift and a decrease in contrast ratio are generated.

A method using a composition of a collimated light source and a screen arranged on a liquid crystal display element has been disclosed in PCT/US94/7369 as a prior proposal for realizing a display with a widened viewing angle. Regarding screen technology for achieving a widened viewing angle, a method is disclosed in U.S. Pat. No. 2,378,252.

Conventional liquid crystal display devices display images by controlling polarized light obtained by polarizing light transmitted from an illumination device. In estimating the light loss in a color liquid crystal display device, it has been found that the light loss by the polarizer alone is approximately 60%. In the case of a color display, the color filter loss in a display device provided with plane-divided color filters is equal to or more than 70%. Approximately 88% of light is lost by the arrangement including the polarizer and the color filters. Accordingly, even if the light loss generated for any other reason is eliminated, only approximately 12% of the projected light from the illumination device can be utilized because of the absorption loss by the polarizer and the color filters.

On the other hand, demands for the liquid crystal display device of note-type personal computer are not only thinness and lightness in weight, but also low power consumption and high brightness in the display. Furthermore, a demand for a decrease in power consumption for the display of a desk top computer and a work station is high. Accordingly, decreasing the power consumption of the liquid crystal display device is indispensable, in addition to the widening of the viewing angle thereof.

Regarding the above issues, methods for decreasing the absorption loss of the polarizer and color filter in order to realize an improvement in brightness are disclosed in JP-A-6-130424 (1994) and JP-A-6-167718 (1994). In accordance with these methods, the efficiency of light utilization is improved by re-utilizing reflected light by controlling the reflection-transmission of circular polarized light in a specified direction of a specified wavelength by use of a cholesteric liquid crystal layer in order to utilize the light of the specified wavelength efficiently.

In order to realize an improvement in brightness, a method relating to the polarizing conversion using a cholesteric liquid crystal is disclosed in JP-A-3-45906 (1991). Another approach, wherein a composition using a cholesteric filter for a back light composition, is disclosed in JP-A-7-36032 (1995).

FIG. 32 illustrates a cross section of a liquid crystal display having a widened viewing angle, such as disclosed in PCT/US94/7369. The display has a problem in that the power consumption of the back light has been significantly increased for obtaining a brighter display, because the transmission factor of the screen is low, in addition to the complexity in the collimating structure and the screen structure. The liquid crystal display element comprises an arrangement wherein a liquid crystal layer 13 is interposed between two transparent substrates 11A, 11B, and two polarizers are arranged on either side thereof (not shown in the figure). A screen 10AA has transparent portions in the shape of a quadrangular pyramid at the displaying plane side and black absorbing bodies covering the intervals therebetween. A collimated illumination device, comprising lamps 51, is provided at both sides of a waveguide, and transparent media 65 in the shape of a quadrangular pyramid are adhered onto the waveguide. In the liquid crystal display device having the above structure, a decrease in resolution caused by thickness of the substrate 11 is suppressed by the collimated illumination device, the viewing angle of which is widened by the screen 10AA. In order to obtain a high resolution with the above structure, a strict collimation is required for the back light depending on the thickness and the index of refraction of the transparent substrate 11A. Simultaneously, a further decrease in the consumption power, a further widening of the viewing angle, and a further improvement in the resolution are required. It has been understood that an increase in the input power to the lamps has an undesirable effect on the display, such as an increase in the temperature due to heating (for instance, providing an inferior image quality and a shortening of the life of the lamp), in addition to an increase in the power consumption.

In the structures disclosed in previously described JP-A-3-45906 (1991) and JP-A-736032 (1995) for improving the efficiency of light utilization, the reflected light is re-utilized using the cholesteric liquid crystal operating as a reflective polarizer. on the other hand, a light control element is used for the liquid crystal display of the note type personal computer in order to improve the brightness at a normal angle toward the display surface with a decreased power consumption. As the light control element used most generally, BEF (commercial name) of the 3M Company is one example. In the light control element described above, the illumination device has a directivity at a normal angle toward a display surface in order to obtain a highly bright display with a low power consumption. However, in the above-mentioned device, the efficiency of the polarizing conversion has not been considered, especially when these light control elements are used for improving the brightness at a normal angle. Furthermore, the efficiency of the polarizing conversion has not been considered when the light control elements are used.

In the light control element, a film having stripes, the cross section of which is a triangle shape, is used. Generally, PET (polyethylene terephthalate) is used as the material for the film, and has a biaxial birefringence. Accordingly, when its optical axis is shifted from the incident angle of incident linearly polarized light, the polarization is changed, and, as the result, a decrease in the efficiency of the polarizing conversion results. Furthermore, it was found that the efficiency of the polarizing conversion was decreased if two light control elements were arranged so as to intersect at right angles.

Compositions for decreasing the absorption loss by the color filter and for improving the efficiency of light utilization are disclosed in previously described JPA-6-130424 (1994) and JP-A-6-167718 (1994). A feature of the above compositions resides in the arrangement of a color selective layer at the outside and the inside of the substrate. Examples of the above-mentioned devices are indicated in FIG. 37 and FIG. 38. In accordance with the structure indicated in FIG. 37, a liquid crystal 503 is interposed between glass substrates 501, 504, a selective layer 500 is arranged at the light projection side, a cholesteric layer 506, i.e. a color selective layer, and a filter layer 505 are arranged at the light incident side, and a light source 507 and a reflector 508 are arranged at rear side of the cholesteric layer 506. In a case of this arrangement, wherein the cholesteric layer 506, i.e. the color selective layer, is arranged outside of the glass substrate 504, as indicated in FIG. 37, the projected light 510 viewed at an angle normal to the display surface does not have any problems, such as mixing of colors in a color display, because the projected light passes through a pixel, wherein the cholesteric layer 506 and the liquid crystal 503 are the same (a region displaying the same color). However, in a case where obliquely projected light 509 is viewed at an oblique angle, for instance, the light transmitted through a red (or green, blue) color selective layer 506 is controlled by a modulating signal for green (or blue), i.e. an adjacent pixel. Accordingly, when viewing at an oblique angle, the correct color is not necessarily displayed depending on the viewing angle, because of the thickness of the substrate 504 (generally the thickness of the glass substrate is 1.1 mm, or 0.7 mm, and the pixel pitch is approximately 100 $\mu$m).

In order to avoid the influence of the thickness of the glass substrate 504, an arrangement wherein the color selective layer 512 and a retardation film 511 are built-in has been proposed, as indicated in FIG. 38. Other constituents are the same as those indicated in FIG. 37. However, any problems concerning oblique incident light relating to the characteristics of the light source have not been considered. In the arrangement indicated in FIG. 38, the display is produced by controlling the polarization to the liquid crystal layer 503 by the color selective layer 512 and the retardation film 511, and controlling the polarization by the liquid crystal layer 503. However, the cholesteric liquid crystal layer used as the color selective layer 512 has an undesirable degree of polarization to the oblique incident light, and, moreover, unnecessary light leakage of color is generated. That means that with respect to the oblique incident light, a polarization other than a desired polarization is generated, leakage of light via a color other than a desired color is generated, and so a deterioration in display quality represented by decreases in contrast ratio, color reproduction and viewing angle characteristics results. Furthermore, any uses of the polarized light effectively have not been considered at all.

SUMMARY OF THE INVENTION

One of the objects of the present invention is to provide a liquid crystal display device which is capable of producing a display with a wide viewing angle and with a low power consumption.

Another one of the objects of the present invention is to provide a liquid crystal display device having a high brightness with a high polarizing conversion efficiency by specifying an optimum axial arrangement of a light control element and a polarizer, when the light control element is utilized for improving brightness at a normal angle.

Still another one of the objects of the present invention is to provide a liquid crystal display device which is capable of realizing improvement of the efficiency of light utilization and the brightness at a normal angle by using a waveguide, which is capable of maintaining polarization of light reflected from a reflective polarizer and of improving the directivity.

A further one of the objects of the present invention is to provide a color liquid crystal display device having a wide viewing angle and a high display quality, even if the display is viewed at an oblique angle, by eliminating any deterioration in display quality (unclearness) based on the thickness of the glass substrate and deterioration in display quality (decreased contrast ratio, deteriorated display color) at an oblique angle, thereby decreasing the absorption loss by the polarizer and the color filters, and improving the efficiency of light utilization.

In order to realize the above objects, the following measures are used in accordance with the present invention.

A liquid crystal display device has liquid crystal display elements for controlling polarized light, and an illumination device arranged at a rear side of the liquid crystal display elements; wherein a screen is provided for the liquid crystal display element, a reflecting means is provided at a rear side of the illumination device, and a light control means and a reflective polarizing selection means are provided between the liquid crystal display element and the illumination device. The display is composed such that the polarized light transmission axis of the reflective polarizing selection means is arranged so as to make the polarized light transmission efficiency of the projected light from the illumination device high.

Furthermore, the liquid crystal display device is composed so that the direction of the longitudinal axis of a pixel of the liquid crystal display element is approximately in parallel with the polarized light transmission axis of the reflective polarizing selection means; the polarized light transmission axis is approximately in parallel or approximately perpendicular with an optical conversion axis of the light control means; the light projected from the illumination device is strongly directed at least in a direction of the minor axis of the pixel; and the screen has a function to broaden the projected light at least in a direction of the minor axis of the pixel.

Furthermore, the liquid crystal display device is composed in a manner such that the screen absorbs external light and transmits the light projected from the illumination device.

Furthermore, the liquid crystal display device is desirably composed in a manner such that a birefringent medium is arranged at a rear side of the light control means by using the reflective polarizing selection means, which transmits linearly polarized light and reflects other linearly polarized light perpendicular to the above transmitted linearly polarized light.

Furthermore, the liquid crystal display device is composed in a manner such that the birefringent medium is arranged in a direction approximately 45 degrees to the polarizing axis of the reflected light so that the birefringent medium operates approximately as a quarter wave plate.

The illumination device is composed so that the polarizing conversion efficiency is increased by maintaining the polarized light reflected from the reflective polarizer in the illumination device, and the directivity at all azimuth angles is enhanced by increasing the directivity at least in an axial direction and concurrently using the light control element. In order to improve the brightness at a normal angle, the illumination device, comprising a flat plate shaped waveguide and a light source arranged in the vicinity of the waveguide, is composed so that the light projected from the light source is transmitted through the waveguide and is projected through a light projecting plane of the waveguide; the light projecting plane of the waveguide is provided with a reflecting plane composed of fine declined planes having a large number of concave planes, convex planes or steps at its rear side; the reflecting plane is mirror-finished at least at the declined plane portion; and the reflector is provided at the rear plane of the waveguide directly or via an air layer.

Furthermore, a reflective color selection means corresponding to each pixel of the liquid crystal display is arranged as a composition for improving the efficiency of the light utilization.

Furthermore, the screen is composed so that the oblique incident light is absorbed efficiently, and the incident light at the normal angle is transmitted efficiently. Particularly, the transmitted light at a normal angle from the liquid crystal display element is transmitted through a small aperture by refraction of light, and the oblique transmitted light is absorbed. The screen is composed in a manner of being covered with an absorbing material which absorbs most of the external light when the screen is viewed from the front display plane side.

The functions of each of the members of the display will be explained hereinafter.

The light reflected from the stripe grooves on the rear plane of the waveguide has a high polarized component in the stripe direction, and the efficiency can be improved by arranging the stripe direction to coincide with the polarized light transmission axes of the reflective polarizer and the incident side polarizer of the liquid crystal display element. The transmission efficiency can be improved further by properly arranging the stripe direction of the light control element to similarity coincide. Generally, the light control element desirably does not have any birefringence, but even if any birefringence exists, the efficiency can be improved by causing its optical axis to coincide with the polarizing axis of the transmitted light or by utilizing its birefringence for operating as a retardation plate.

The display is performed by controlling the polarizing condition of the polarized light passing through the liquid crystal layer by controlling the orientation of the liquid crystal layer. The absorption type polarizing selection means is a so-called linear polarizer capable of absorbing unnecessary polarized light for transmitting one of the components of linearly polarized light intersecting in right angles each other and absorbing the other component of the linearly polarized light, or a so-called circular polarizer capable of absorbing unnecessary polarized light for transmitting one of two components of circularly polarized light and absorbing the other component of the circularly polarized light. The reflective polarizing selection mess is a linear polarizer capable of reflecting unnecessary polarized light for transmitting a part of linearly polarized light intersecting, for instance, at right angles with each other and reflecting the rest of the linearly polarized light, or a circular polarizer capable of reflecting unnecessary polarized light for transmitting a part of the circularly polarized light and reflecting the rest of the circularly polarized light. The reflective color selection means is a so-called color filter reflecting polarized light in an unnecessary wavelength region, which transmits a part of linearly polarized light (or circularly polarized light) having a specified wavelength (for instance, a center wavelength of 550 nm±approximately 40 nm) and reflects linearly polarized light (or a circularly polarized light) in other wavelength regions. More details will be explained later with reference to various embodiments, but the reflective color selection means utilizes selective reflection of the cholesteric layer and characteristics of a multilayered dielectric film. Generally, because the color selection means utilizing such selective reflection of the cholesteric layer and characteristics of the multilayered dielectric film has a large viewing angle dependence, coloring material absorbing light other than the desired light to be transmitted can be mixed or laminated.

The screen is a means for diffusing or diffracting incident light, such as, for instance, an arrangement of beads or rod lenses, the projection side of which is covered with a black absorbing material, or a scattering medium having a hologram or non-uniform index of refraction. The screen desirably maintains the polarization of the polarized light and has a role to make the viewing angle wide by broadening the projected light having a high collimation from the illumination device at the projecting side of the liquid crystal display element. Furthermore, the screen operates to absorb external light efficiently. A means for increasing collimation of the projected light at the illumination device comprises, for instance, a wedge shaped waveguide having stripes of microgrooves at its rear plane, and an arrangement of a lens sheet having stripes of triangle shapes intersecting with stripes of grooves as the light control means on the waveguide. Thereby, the projected light having a high collimation in a direction perpendicular to the direction of the stripes can be obtained by the stripes of the microgrooves of the waveguide, and, furthermore, the collimation in a direction intersecting with the above projected light can be improved by the use of the lens sheet. Accordingly, the illumination device having a high collimation at all azimuth angles can be obtained.

When the collimated light from the illumination device is undesirable, the problems caused by unclearness of the displayed image and the mixing of colors are as indicated in the embodiment shown in FIG. 37 and FIG. 38. Therefore, the collimated light from the illumination device is important for obtaining a clear image display. Using the liquid crystal display element indicated in FIG. 39, necessary collimation of the light source was investigated. First, in accordance with the present invention, a structure is composed by arranging the liquid crystal layer 13 between the transparent substrates 11A, 11B, at the projection side of which, the absorption type polarizing selection layer 14A and the screen 10 are arranged; and, at the incident side thereof, the retardation film 71, i.e. a reflective color selection layer 70, and cholesteric layer 72 are arranged. Here, the thickness 11At, 11Bt of the transparent substrates 11A, 11B are both t, the pixel pitch is d, the incident angle 430 of the incident light to the liquid crystal display element 20 is expressed by $\theta_1$, the incident angle 431 of the incident light to the transparent substrate 11B is expressed by $\theta_2$, and the index of refraction of the transparent substrates 11A and 11B are both expressed as n. Here, three pixels of R, G, and B are arranged to form a picture element. Generally, one pixel had a ratio of vertical direction to lateral direction of 3:1, and the short side of the pixel was designated as the pixel pitch d. The color mixing and the unclearness based on the thickness of the substrate by oblique incident light must be restricted in at least two pixels at an angle where the brightness is ½ of the peak brightness. Otherwise, the displayed image becomes unclear. Accordingly, the incident angle $\theta_1$ of the incident light must satisfy the following equation (1).

$$\theta_1 \leqq \sin^{-1}(n \cdot \sin(\tan^{-1}(2/dt))) \qquad (1)$$

Assuming that the refractive index of the transparent substrate n=1.53, the thickness t=700 μm, and the pixel pitch d=100 μm, the incident angle $\theta_1$ of the incident light must be equal to or less than 24.9 degrees. Otherwise, the incident light will overlap with pixels of other colors, and a decrease of the image quality, such as a mixing of colors, unclearness, and the like, will be generated. Accordingly, the collimated light from the illumination device must be in an angular range which satisfies the condition (1) with at least a half width (an angular range of brightness which is ½ of the peak brightness). Therefore, with the transparent substrate and pixel used in the present embodiment, an incident angle equal to or less than 24.9 degrees is necessary. The screen desirably absorbs the oblique incident light effectively to suppress a decrease in resolution.

DESCRIPTION OF THE PREFERRED EMBODIMENTS

Figure 1:
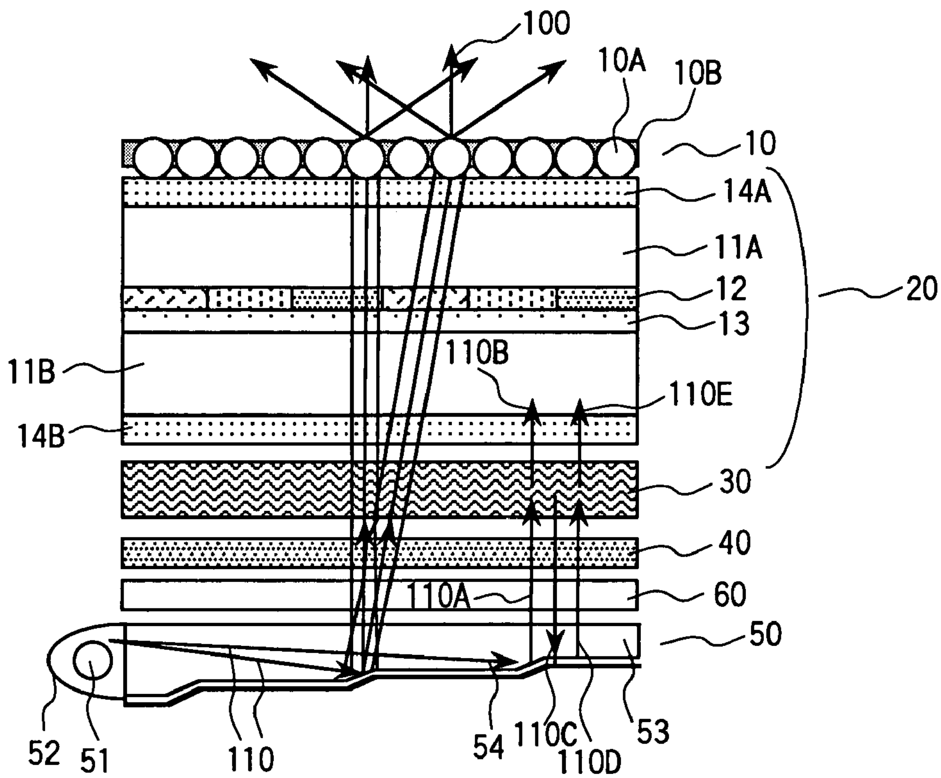
FIG. 1 is a cross section of the liquid crystal display device representing an embodiment of the present invention.

First, the illumination device will be explained hereinafter.

The illumination device is called a back light and can be classified roughly into two types, i.e. a direct-below type back light and edge-light type back light. The direct-below type back light is composed so that light sources are provided inside the illuminating plane. On the other hand, the edge-light type back light is composed so that light sources are provided outside the illuminating plane. The waveguide, i.e. forming the illuminating plane, is made of a transparent acrylic resin and the like cylindrical light-sources, such as fluorescent lamps (cold-cathode discharge tube, or hot-cathode discharge tube) and the like are arranged at one-side or two sides of the waveguide and lamp covers composed of reflectors are arranged outside of the light-sources for projecting light into the waveguide. The edge light type back light is effective a the liquid crystal display device which is required to be thin, and the direct-below type back light is effective for a liquid crystal display device which is required to be light in weight and have a small frame.

The edge-light type back light has been mainly used for the conventional liquid crystal display device, And the waveguide is has white ink applied at its rear plane in order to obtain homogeneity in the plane. Furthermore, in order to improve the efficiency of the light utilization, a reflective polarizer is used. The reflective polarizer is a device, such as a polarized light separator having dielectric multilayers as disclosed in U.S. Pat. No. 5,486,949, and "SID92 Digest" pp. 427, or a cholesteric film quarter wave plate as disclosed in JP-A-7-36032 (1995) and "Asia display 951, pp. 735. Hereinafter, the former, i.e. the polarized light separator having dielectric multilayers, will be called a reflective polarizer type 1, and the latter, i.e. the cholesteric film quarter wave plate, will be called a reflective polarizer type 2.

S polarized light, which indicates a polarization of light, is polarized light perpendicular to the incident plane (the incident plane means a plane formed by incident light and incident normal to the boundary plane), and P polarized light is polarized light parallel to the incident plane.

Assuming an incident angle θ when incident light passes from medium $N_0$ to medium $N_1$ at a boundary plane of a transparent medium having an index of refraction $N_0$ and a transparent medium having an index of refraction $N_1$, it is well known that, when the tangent of the incident angle θ is equal to $N_1/N_0$ (i.e. $\tan\theta=N_1/N_0$), no reflective component exists in the P polarized light, all the reflection light becomes S polarized light, and the transmitted light comprises the rest of the S polarized light and the P polarized light. The incident angle in the above case is called the Brewster angle. A reflective polarizer capable of transmitting only the P polarized light and reflecting the S polarized light by controlling the phases of the respective type of the polarized light can be manufactured by utilizing the Brewster angle, laminating various media having different indexes of refraction on each other, and controlling the thickness of the laminated film with a wavelength order.

Figure 10:
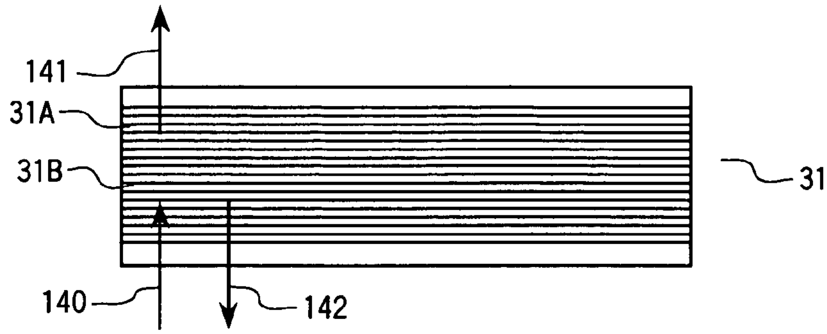
FIG. 10 is a cross section of the reflective polarizer applied to the liquid crystal display device of the present invention.
Figure 11:
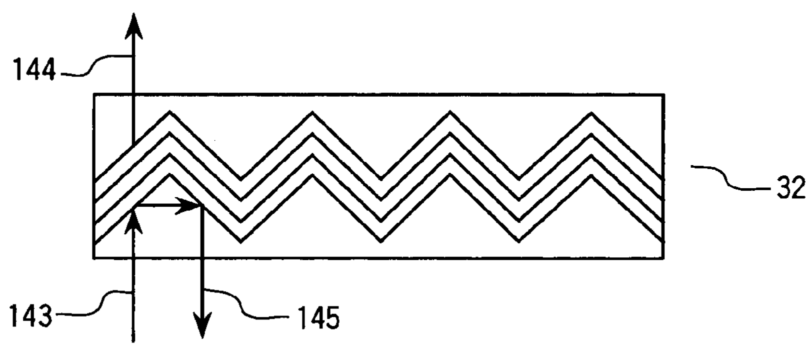
FIG. 11 is a cross section of the reflective polarizer applied to the liquid crystal display device of the present invention.

Examples of the reflective polarizer type 1 are illustrated in FIG. 10 and FIG. 11.

FIG. 10 shows a reflective polarizer 31 formed by laminating a large number of layers while aligning their optical axes, wherein the layers include an uniaxial anisotropic transparent medium 31A having an anisotropy in the index of refraction and an isotropic transparent medium 31B. Of the non-polarized light 140 incident on the reflective polarizer 31, only a linearly polarized light 141 is transmitted through the polarizer, and linearly polarized light 142 intersecting the polarized light 141 at right angles is reflected.

FIG. 11 shows a structure wherein two kinds of prism shaped transparent media having different indexes of refraction from each other are laminated alternately. The reflective polarizer 32 transmits only the P polarized light 144 and reflects the S polarized light 145 intersecting the P polarized light at right angles among the incident non-polarized light 143.

The reflected linearly polarized light is converted to elliptically polarized light (including linearly polarized light and circularly polarized light) by a retardation film, when treated with a scattering film as a depolarizer, or a retardation film to change the polarization of the light. Then, the light enters into the reflective polarizer again, wherein only one component of the linearly polarized light is transmitted, while the other component of the linearly polarized light intersecting at right angles therewith is reflected back to the waveguide. Theoretically, almost all the light can be converted to linearly polarized light and projected by repeating the above cycles.

However, because of the effect of absorption at various portions, practically, an arrangement of the retardation film operating as a quarter wave plate so as to be a half wave plate after reciprocally transmitting the light, is desirable, in order to convert all the reflected linearly polarized light to linearly polarized light intersecting at right angles.

Figure 12:
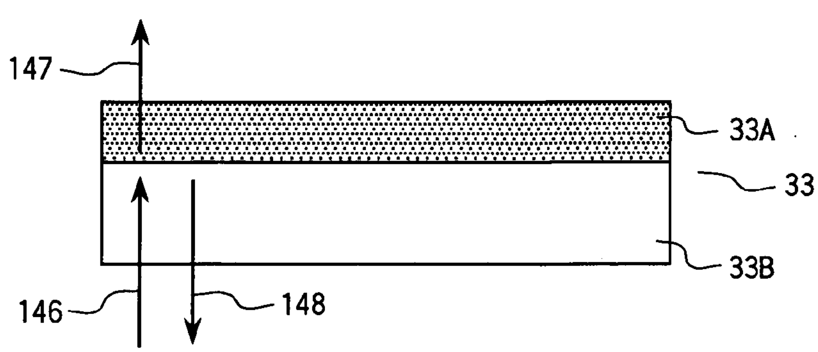
FIG. 12 is a cross section of the reflective polarizer applied to the liquid crystal display device of the present invention.

On the contrary, FIG. 12 shows an example of the reflective polarizer type 2.

The structure illustrated in FIG. 12 is obtained by laminating a cholesteric liquid crystal polymer 33A as disclosed in "Asia Display 95 Digest" pp. 735 onto a cholesteric liquid crystal polymer 33B having a pitch different from the cholesteric liquid crystal polymer 33A, so as to indicate selective reflection in a visible wavelength region, in order to transmit circularly polarized light having a certain rotation in the non-polarized light 146 and to reflect other circularly polarized light 148 having a rotation reverse to the above rotation, and by laminating a quarter wave plate thereon in order to transmit the linearly polarized light 147.

The reflective polarizer type 2 operates to generate linearly polarized light in a direction by transmitting right-handed circularly polarized light (or a left-handed polarized light), reflecting the left-handed circularly polarized light (or a right-handed circularly polarized light), and processing the transmitted light with the quarter wave plate. On the other hand, the reflected left-handed circularly polarized light (or a right-handed circularly polarized light) is further reflected by a mirror reflector so as to be converted to right-handed circularly polarized light (or a left-handed circularly polarized light), following which it is transmitted through the reflective polarizer type 2 and processed with the quarter wave plate. Finally, all the light is converted to linearly polarized light. Even if the reflector is not a mirror reflector, the reflected light becomes elliptically polarized light (including linearly polarized light and circularly polarized light), and enters into the reflective polarizer again. Then, only the right-handed circularly polarized light (or in a left-handed circularly polarized light) is transmitted, and the left-handed circularly polarized light (or in a right-handed circularly polarized light) is reflected to the waveguide. After repeating the above processes, almost all the light is converted to right-handed circularly polarized light (or a left-handed circularly polarized light) and is projected as linearly polarized light after being processed with the quarter wave plate. In accordance with the objective of providing no small absorption of light with the reflector, the reflector is desirably a mirror reflector, in order to convert all the reflected left-handed circularly polarized light (or a right-handed circularly polarized light) to right-handed circularly polarized light (or a left-handed circularly polarized light).

In order to clarify the differences in the composition and advantages of the liquid crystal display device of the present invention from the prior art, a conventional liquid crystal display device will be explained hereinafter with reference to FIG. 33–FIG. 36.

Figure 35:
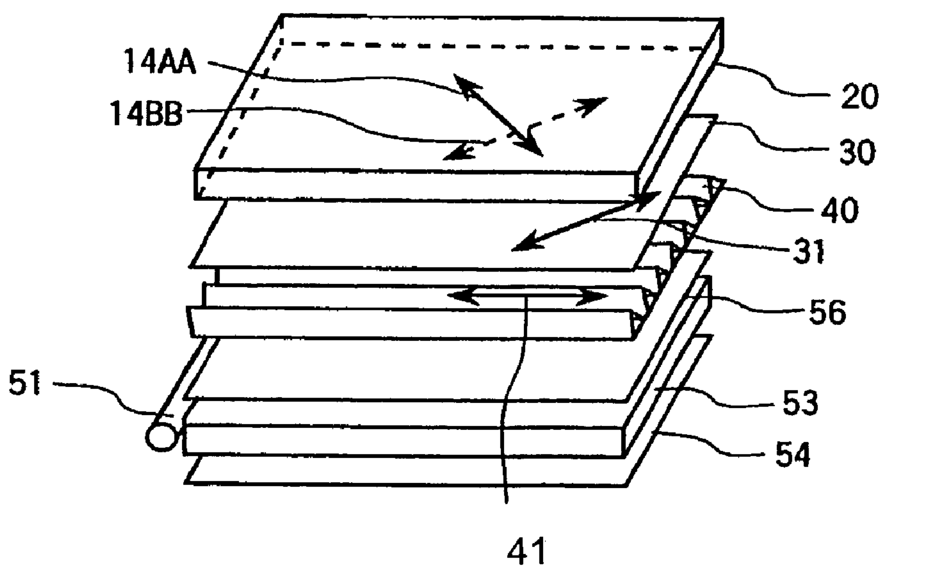
FIG. 35 is a partially exploded view of the conventional liquid crystal display device.

FIG. 35 is a partially exploded view showing the composition of a conventional edge-light type back light.

The edge-light type back light in the conventional device comprises a waveguide 53 made of a piece of transparent acrylic resin having white ink on its rear plane; a reflector 54 arranged on the rear plane of the waveguide 53; a light source 51 arranged at least at one of the side planes of the waveguide 53; and a diffusion film 56 arranged on the light projecting plane of the waveguide 53.

As a component for increasing the brightness at a normal angle, light control elements 40 are arranged in parallel or perpendicular to the long side of the light source 51. To the liquid crystal display element 20, a TN mode having a 90 degrees twist is applied as the most general mode. The liquid crystal display element 20 is in a so-called normally white mode, wherein the polarizing axis 14BB of the lower polarizer is arranged so as to intersect perpendicularly with the polarizing axis 14AA of the upper polarizer. Accordingly, the transmission axis 31 of the polarized light at the reflective polarizer 30 is arranged in parallel with the polarizing axis 14BB of the lower polarizer. That is, the direction 41 of the stripes of the light control element 40 (hereinafter, the direction, which an optical path intersecting perpendicularly with the above direction 41 is converted to, is called an optical path conversion axis of the light control element) is composed so as to intersect at 45 degrees with the transmission axis 31 of the polarized light of the reflective polarizer 30.

Figure 34:
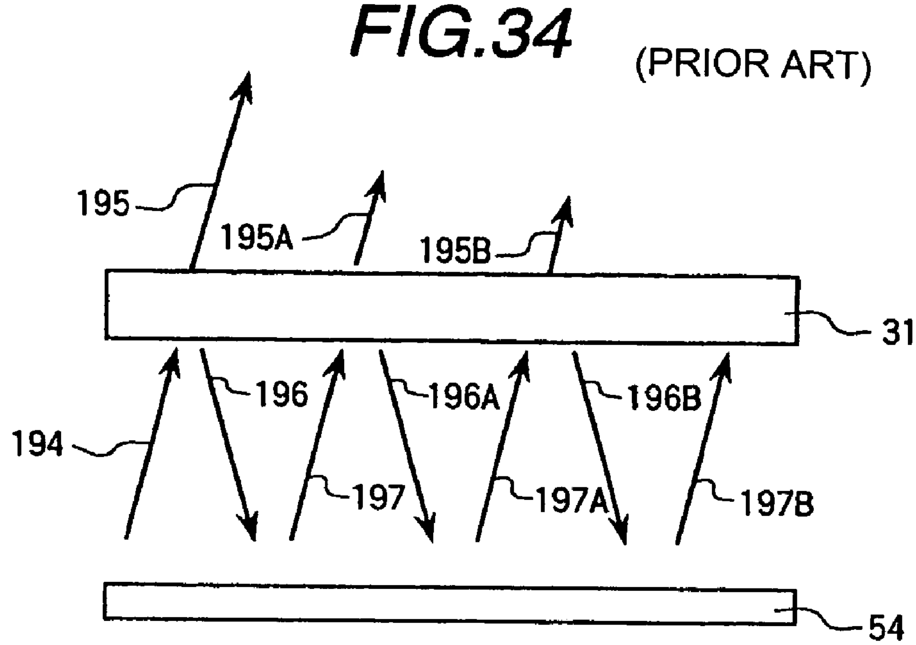
FIG. 34 is a diagram indicating an operation of the conventional liquid crystal display device.

In case the reflective polarizer type 1 is used as the reflective polarizer 30 in the above composition, as seen in FIG. 34, when the light 194, which is non-polarized light, is projected from the waveguide to the reflective polarizer 31, only a part of the linearly polarized light 195 is transmitted through the polarizer 31, and the rest of the linearly polarized light 196 intersecting perpendicularly with the polarized light 195 is reflected by the reflective polarizer 31. It has been understood that the optical axis of the birefringence of the light control element 40 is in the direction of the light control axis. At that time, the reflected light 196, which is linearly polarized light, can not maintain its polarization and the linearly polarized light becomes elliptically polarized light based on the birefringence of the light control element 40, because the direction of the polarizing axis forms an angle of 45 degrees with the light control element 40. The elliptically polarized light becomes non-polarized light 197 due to an optical diffusion with the white ink on the rear plane of the waveguide and the diffuser 56, and is reflected by the reflector 54. Accordingly, only a component in parallel with the polarized light transmission axis of the reflective polarizer 31 is transmitted and becomes linearly polarized transmitted light 195A, which is polarized the same as the transmitted light 195. The reflected linearly polarized light 196A intersecting perpendicularly with the linearly polarized light of the transmitted light 195A becomes non-polarized light 197A by the same processes as produced the reflected light 196, and further becomes linearly polarized transmitted light 195B, which is polarized the same as the transmitted light 195 and 195A by the same processes as described above. Furthermore, the reflected light 196B becomes non-polarized light 197B by the same processes as produced the reflected light 196A.

Theoretically, all the light can be projected after being converted to the same linearly polarized light by repeating the above processes. However, when the efficiency of the projected light from the liquid crystal display device was measured practically, it was found that the amount of luminous flux was increased only approximately 30% by the presence of the reflective polarizer 31. The direct reasons for the decrease in the efficiency can be assumed to be based on the absorption by the reflector 54, the waveguide, the white ink, the diffuser, and other elements, and further, on the transmission of unnecessary polarized light depending on the efficiency of the reflective polarizer 31. That is, although the absorption of each respective component per each transmission and reflection is small, the polarizing conversion can not be performed effectively by only a single reflection with the conventional composition, and so a large number of repetitions of the transmission and reflection are needed for the conversion. Consequently, the absorption by the respective components is increased. That is, the fundamental reason for the decrease in the efficiency is based on the fact that, because the direction 41 of the stripes of the light control element 40 intersects by an angle of 45 degrees with the polarized light transmission axis 31 of the reflective polarizer 30, as shown in FIG. 35, the linearly polarized light is converted to elliptically polarized light by the birefringence. Therefore, the conversion can not be performed effectively by only one reflection, and so the polarizing conversion is performed by a large number of repetitions of the reflection. Accordingly, it is assumed that the efficiency of the polarizing conversion is decreased significantly due to the influence of absorption on the respective light components.

Figure 33:
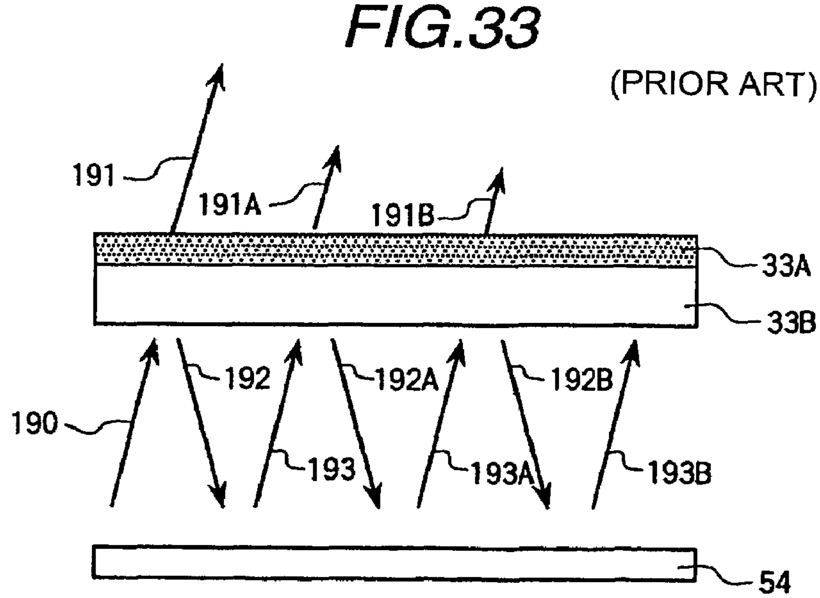
FIG. 33 is a diagram indicating an operation of the conventional liquid crystal display device.

In case the reflective polarizer type 2 is used as the reflective polarizer 30 in the above composition, as seen in FIG. 33, when the projected light 190, which is non-polarized light, is projected from the waveguide, only a part of the circularly polarized light is transmitted and converted to linearly polarized light 191 by the retardation film 33A. The rest of the circularly polarized light 192 is reflected by the reflective polarizer 33. At that time, the reflected light 192, which is circularly polarized light, becomes elliptically polarized light, because the polarization can not be maintained based on the birefringence of the light control element 40. Furthermore, the reflected light 192 becomes non-polarized light 193 by optical diffusion with the white ink at the rear plane of the waveguide and the diffuser, and is reflected by the reflector 54. Accordingly, a part of the circularly polarized light is transmitted through the reflective polarizer 33, and converted to the linearly polarized light 191A in the same manner as the linearly polarized light 191 by the retardation film 33A. The circularly polarized light 192A in a reverse rotation is reflected, and becomes non-polarized light 193A by the same processes as produced the reflected light 192. Similarly, light components 191B, 192B, and 193B are obtained.

Theoretically, all the light can be converted to the same linearly polarized light by repeating the above processes in this arrangement. However, when the efficiency of the projected light from the liquid crystal display device was measured practically, it was found that the amount of luminous flux was increased only approximately 30%, similar to the case using the reflective polarizer type 1. The reasons can be assumed to be based on the absorption loss by the large number of reflections similar to the case of the reflective polarizer type 1. In the case of the reflective polarizer type 2, it is assumed that the problem can be moderated by using an isotropic medium having no birefringence in the light control element 40, or by arranging the retardation film so that the reflected light must intersect perpendicularly or be in parallel with the light control axis before entering into the light control element 40, because the circularly polarized light is reflected.

Figure 36:
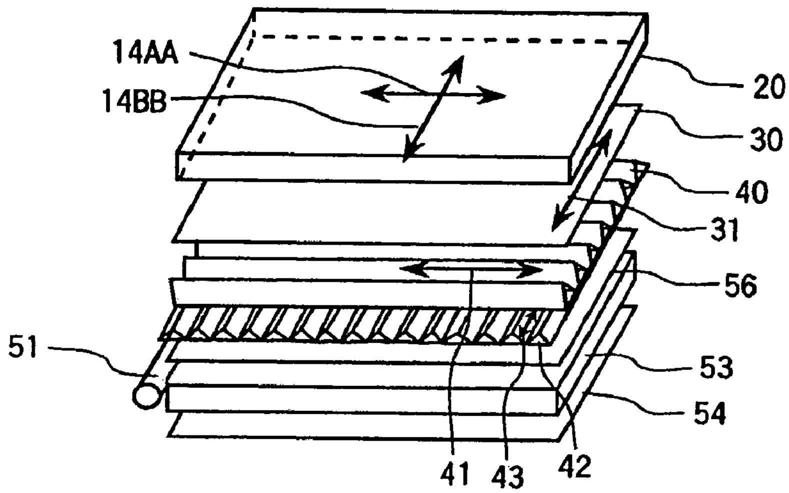
FIG. 36 is a partially exploded view of the conventional liquid crystal display device.
Figure 37:
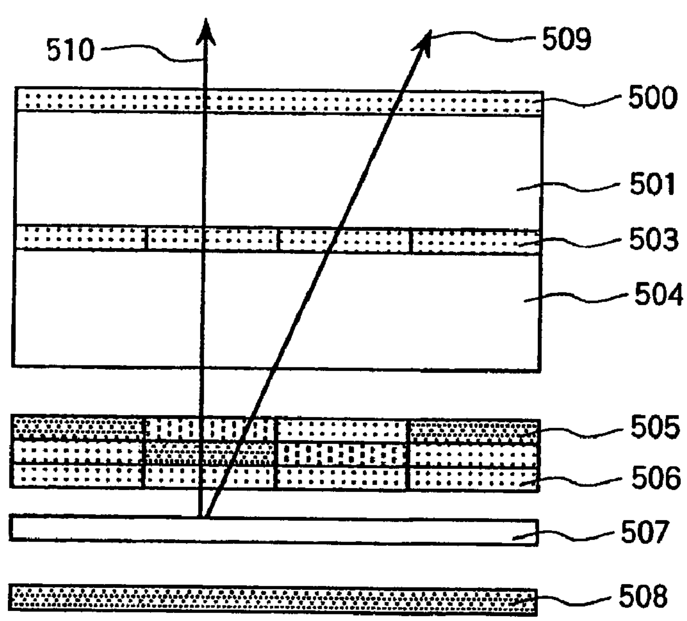
FIG. 37 is a diagram indicating an operation of the conventional liquid crystal display device.
Figure 38:
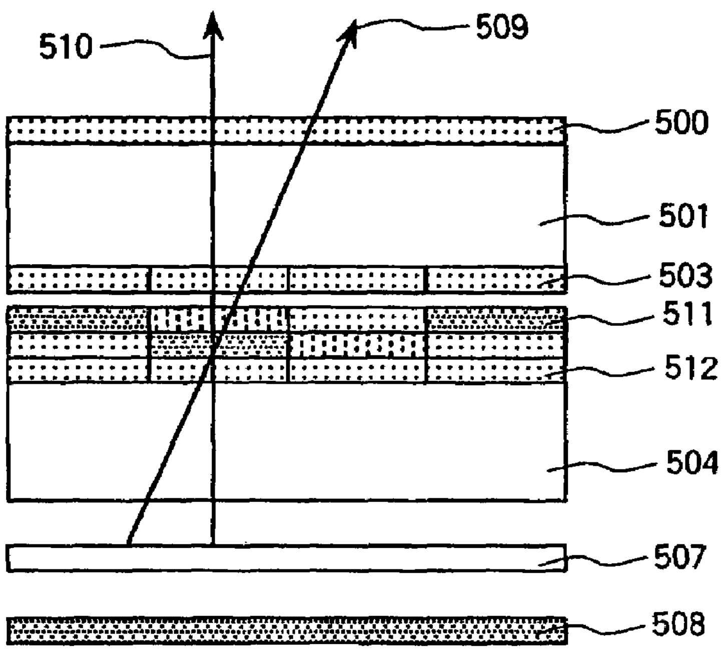
FIG. 38 is a diagram indicating an operation of the conventional liquid crystal display device.

Conventionally, a device wherein the light control elements are arranged so that each light control axis intersects perpendicularly with the light control elements 40, 42, as indicated in FIG. 36, has been considered for further increasing the brightness at a normal angle. In accordance with such an arrangement, the brightness at a normal angle can be increased by making a piece of light control element, which conventionally has only one axial directivity (horizontal or vertical direction), have a directivity at approximately all azimuth angles.

The conventional edge-light type back light comprises a waveguide 53 made of a piece of transparent acrylic resin having white ink on its rear plane; a reflector 54 arranged on the rear plane of the waveguide 53; a light source 51 arranged at least at one of the side planes of the waveguide 53; and a diffuser 56 arranged on the light projecting plane of the waveguide 53. The light control axis of each of the light control elements is arranged in parallel or perpendicularly with the long side of the light source 51.

To the liquid crystal display element 20, a TN mode having a 90 degrees twist is applied as the most general mode. The liquid crystal display element 20 in this case in a so-called normally white mode, wherein the polarizing axis 14BB of the lower polarizer is arranged so as to intersect perpendicularly with the polarizing axis 14AA of the upper polarizer. Accordingly, the transmission axis 31 of the polarized light at the reflective polarizer 30 is arranged in parallel with the polarizing axis 14BB of the lower polarizer. That is, the directions 41, 43 of the stripes of the light control elements 40, 42 are composed so as to be in parallel or intersect perpendicularly with the transmission axis 31 of the polarized light of the reflective polarizer 30.

Even if the liquid crystal display device is composed as described above, the efficiency of light utilization is increased by only approximately 30% by applying the reflective polarizer, which is similar to the arrangement of FIG. 35. In accordance with the above composition, in a case when the reflective polarizer type 2 is used as the reflective polarizer 30, it is necessary to convert to the linearly polarized light by arranging the retardation film just before the light control element 40. However, the efficiency of light utilization is increased only approximately 30% when the reflective polarizer type 1 is used. The reason for obtaining the above efficiency has been found to be that the light control elements 40, 42 are anisotropic media, and their polarization is changed if projective components of their optical axes are in parallel or perpendicular with the incident linearly polarized light. It has been found that the influence of the change in the polarization is small when only one light control element is used, but when the number is two, the influence is enhanced in comparison with the case where the number is one. The reason the influence is enhanced can be assumed to be that, when the apex angle of the light control element 40 is 90 degrees, the perpendicularly incident light is not projected because all the light is reflected, multi-reflection is repeated by using two pieces of the light control elements, and the efficiency is decreased significantly due to the influence of the change in the polarization.

As described above, it was found that the efficiency of the light utilization could not be increased on account of the large number of reflections, when the reflective polarizer and the light control element were used for improving the efficiency of light utilization and for improving the brightness at a normal angle. Also, it was found that the efficiency could not be increased on account of misalignment of the optical conversion axis of the light control element with the transmission axis of the polarized light.

Figure 13:
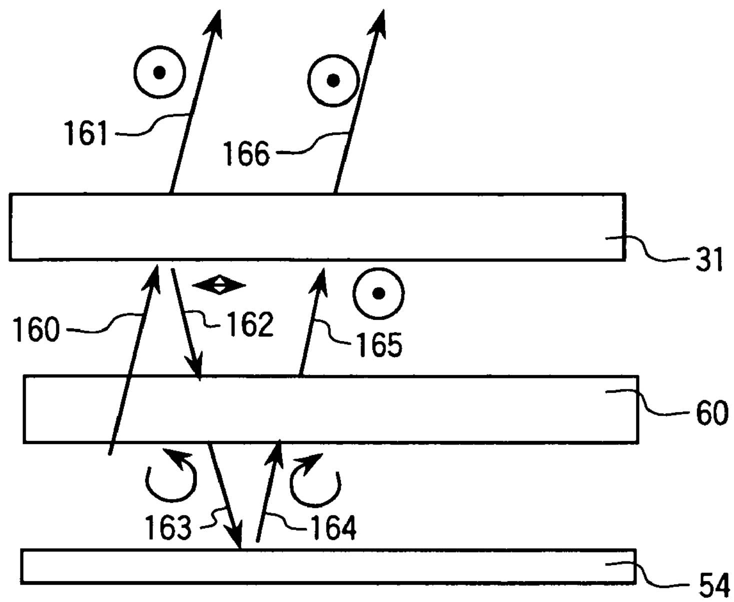
FIG. 13 is a diagram indicating an operation of the liquid crystal display device of the present invention.
Figure 14:
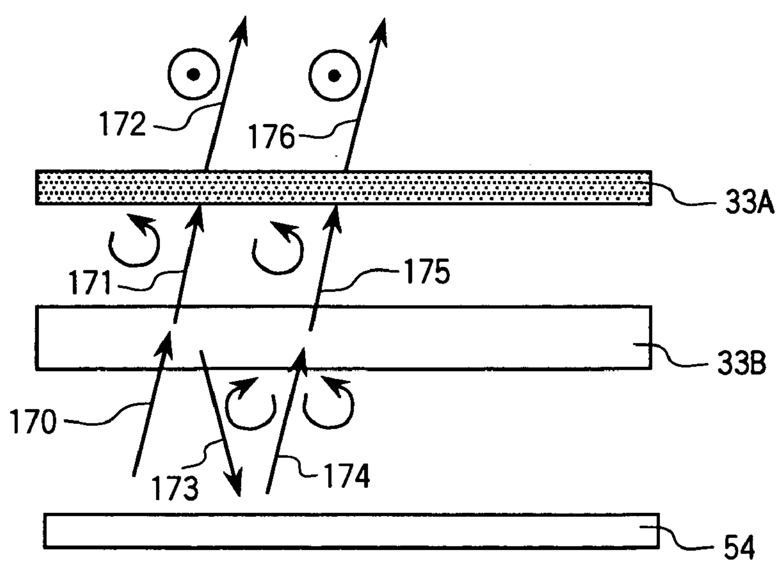
FIG. 14 is a diagram indicating an operation of the liquid crystal display device of the present invention.

Hereinafter, the theory of the present invention, wherein the reflected light can be re-used effectively with only a single reflection, will be explained with reference to FIG. 13 and FIG. 14.

First, the operation when the reflective polarizer type 1 is used as the reflective polarizer 30 will be explained with reference to FIG. 13.

Linearly polarized light 161, which is a part of the non-polarized light 160 projected from the waveguide, is transmitted through the reflective polarizer 31, and the other linearly polarized light 162, which is the rest of the non-polarized light 160 and which intersects perpendicularly with the transmitted light 161, is reflected by the reflective polarizer 31. Then, the reflected light 162 is converted to circularly polarized light 163 by the birefringent medium 60 operating as a quarter wave plate. The circularly polarized light 163 is reflected by the reflector 54 to form circularly polarized light 164 having a rotation in a direction reverse to the circularly polarized light 163. The circularly polarized light 164 is converted to the same linearly polarized light 165 as the transmitted light 161 by the birefringent medium 60 and is transmitted through the reflective polarizer 31 to form the linearly polarized light 166. In accordance with the above processes, all the light is converted to the same linearly polarized light by only a single reflection, and efficient polarizing conversion can be achieved.

Now, the operation when the reflective polarizer type 2 is used as the reflective polarizer 30 will be explained with reference to FIG. 14.

Circularly polarized light 171, which is a part of the non-polarized light 170 projected from the waveguide, is transmitted through the cholesteric layer 33B, and converted to linearly polarized light 172 by the birefringent medium 33A operating as a quarter wave plate. Other circularly polarized light 173 reflected by the cholesteric layer 33B is reflected by the specular reflector 54, and is converted to circularly polarized light 174 having a rotation in a direction reverse to the circularly polarized light 173. The circularly polarized light 174 is transmitted through the cholesteric layer 33B, converted to the same linearly polarized light 176 as the transmitted light 172 by the birefringent medium 33A, and is projected. In accordance with the above processes, all the light is converted to the same linearly polarized light by only a single reflection, and efficient polarizing conversion can be achieved. When the reflective polarizer type 2 is used, the linearly polarized light is desirably converted before entering into the light control element, or at least a uniaxial anisotropic, further, an isotropic media, is desirably applied as the light control element. When uniaxial anisotropic medium is used as the light control element, the light control element desirably operates as a quarter wave plate so as to convert the linearly polarized light to circularly polarized light after transmission.

As described above, the light control element must be arranged so as not to be affected by the influence of the birefringence, in order to perform the polarizing conversion efficiently with only a single reflection. Furthermore, it was found that maintaining the polarization by the waveguide, the diffuser, and the like was optimum for improving the efficiency. When the brightness at a normal angle is increased by increasing the directivity at all azimuth angles, two of the light control elements 40 are conventionally used. However, when two elements are used, the efficiency was decreased by a light loss due to multi-reflection. Therefore, an arrangement, wherein the directivity in an uniaxial direction is increased by the waveguide, and the directivity in a direction perpendicular to the above is increased by the light control element, is effective.

An example of the waveguide of the present invention will be explained hereinafter with reference to FIG. 7–FIG. 9.

Figure 7:
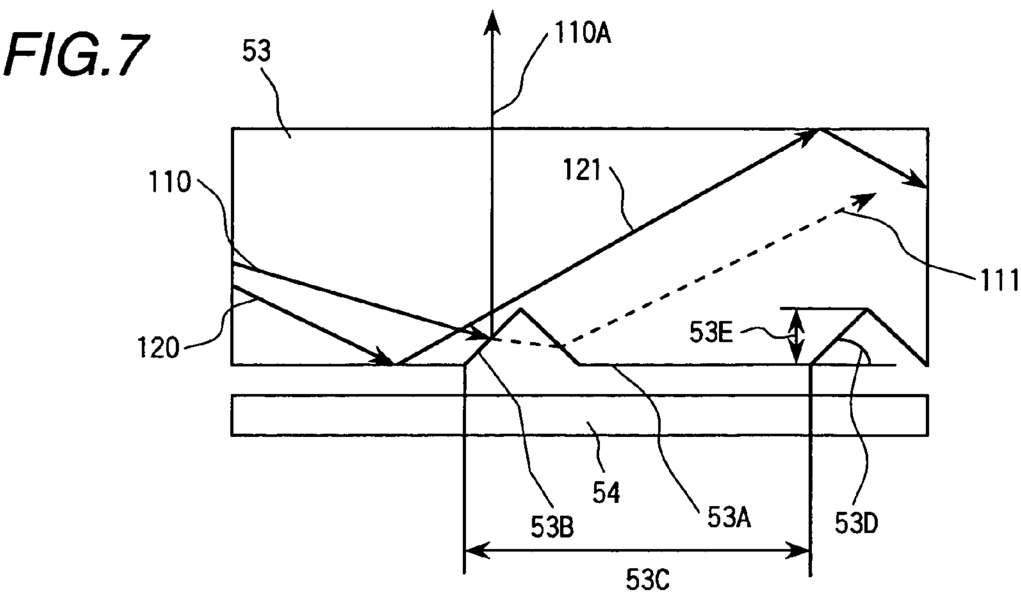
FIG. 7 is a cross section of the illumination device representing an embodiment of the present invention.

In order to reflect the reflected light from the reflective polarizer to the liquid crystal display element region again while maintaining its polarization, fine inclined planes 53B for specular reflection and flat mirror portions 53A are provided at the rear plane of the waveguide 53, and a specular reflector 54 is provided beneath the rear plane of the waveguide 53, as indicated in FIG. 7. In the above case, the inclined plane 53B has a small area ratio in comparison with the flat portion 53A. The inclined plane 53B is for projecting light from the waveguide 53, and the specular reflecting flat portion 53A is for propagating light by reflecting all the light in the waveguide 53. Although the inclined plane and the flat plane can be formed as metallic reflecting planes, total internal reflection having the highest reflection rate is desirably utilized, because the number of reflections is enormous when light is propagating in the waveguide.

Figure 8:
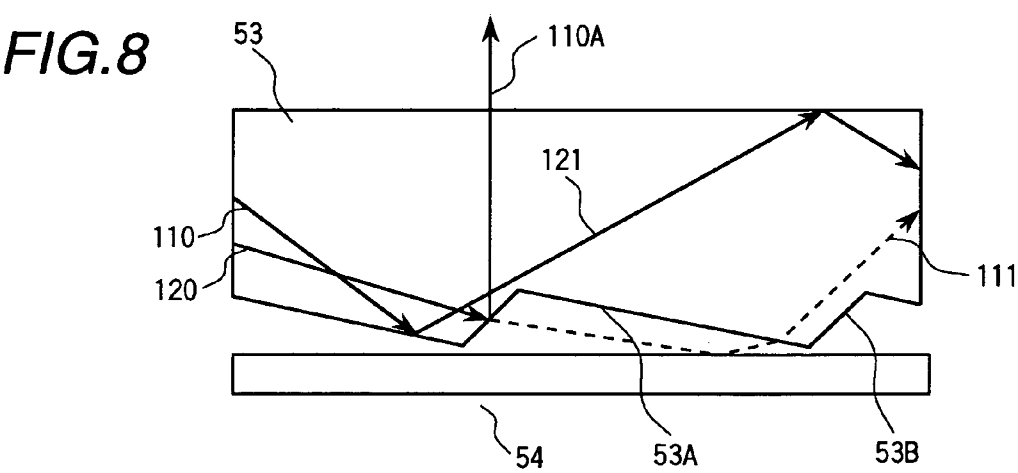
FIG. 8 is a cross section the illumination device representing an embodiment of the present invention.

The inclined portions 53A and slightly inclined flat portions 53B can be provided as indicated in FIG. 8.

In accordance with this configuration, almost all of the light reflected from the reflective polarizer is transmitted through the flat portion at the rear plane of the waveguide and is reflected by the reflector arranged beneath the rear plane of the waveguide so as to be projected from the waveguide again while maintaining its polarization. Therefore, the brightness can be improved by utilizing the light efficiently with scarce absorption by the polarizer at the incident light side of the liquid crystal display element.

Figure 9:
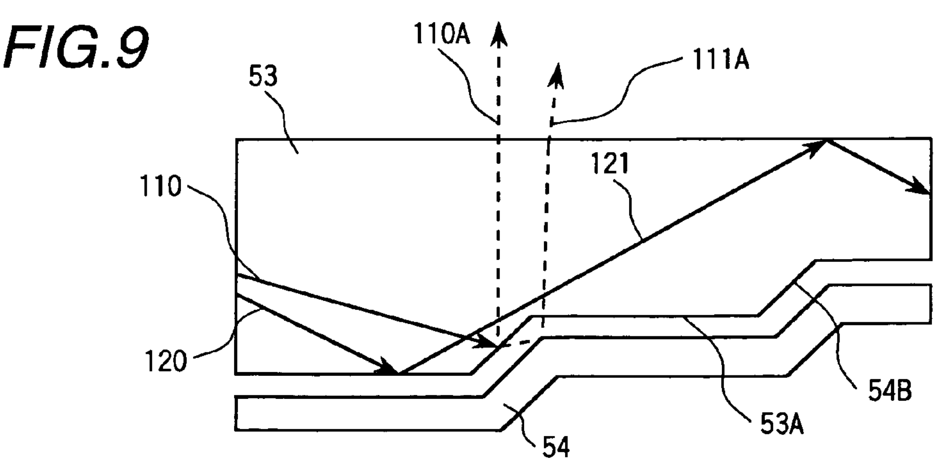
FIG. 9 is a cross section of the illumination device representing an embodiment of the present invention.

Furthermore, the inclined portions 53A and stepwise flat portions 53B can be provided as indicated in FIG. 9. In accordance with this configuration, almost all of the light reflected from the reflective polarizer is transmitted through the flat portion at the rear plane of the waveguide and is reflected by the ref lector arranged beneath the rear plane of the waveguide so as to be projected from the waveguide again while maintaining approximately the same polarization. Therefore, the brightness can be improved by utilizing the light efficiently with scarce absorption by the polarizer at the incident light side of the liquid crystal display element.

When the light 120 from the light source is projected to the flat mirror portion 53A at the rear plane of the waveguide 53, the light is totally reflected as indicated at 121 due to TIR (totally internal reflection), is propagated in the waveguide 53, and is projected as indicated at 110A from the waveguide 53 only when the light is projected to the fine mirror reflection plane 53B.

Otherwise, the transmitted light is propagated in the waveguide 53 as indicated at 111. The light is also totally reflected at the upper plane of the waveguide 53 due to TIR (totally internal reflection). The light having an incident angle equal to or more than a total reflection angle $\theta_c$, which is defined by the index of refraction of the waveguide 53, is totally reflected at the surface of the waveguide 53 and is propagated in the waveguide 53. The light having an incident angle less than the total reflection angle $\theta_c$ is refracted at the upper plane of the waveguide and is projected from the waveguide. For instance, the total reflection angle $\theta_c$ at a boundary between air (index of refraction n=1) and a transparent resin, such as an acrylic resin, polycarbonate, polyurethane, polystyrene, and the like (n=approximately 1.5), is given as follows:

$$\theta_c=\sin^{1}(1/n)=42°$$

The angle θ of the incident light into the waveguide is in the range given as follows:

$$-90°-\theta_c)\leqq e\leqq+(90°-\theta_c)$$

Therefore, the incident light is totally reflected at the flat portion of the upper and lower planes of the waveguide.

Furthermore, referring to FIG. 9, the light is projected from the waveguide 53 as indicated at 110A only when the light is projected to the fine mirror reflecting plane 53B, and simultaneously, the transmitted light is reflected by the reflector at the rear plane of the waveguide 53 to form the projected light 111A.

The most important feature of the present invention is making the optical conversion axis perpendicular to the polarizing direction by realizing an uniaxial direction with the waveguide, and realizing a direction intersecting the above uniaxial direction perpendicularly with the light control element, in order to improve the efficiency of the re-utilization when the reflective polarizer is used.

Utilizing the fact that the ratio of the length in the vertical direction and the length in the lateral direction of the pixel of the liquid crystal display element is generally 3:1, the illumination devices indicated in FIG. 7–FIG. 9, which are capable of improving collimation of illuminated light at least in the direction of the minor axis of the pixel, are used. These illumination devices have a larger polarized component in a direction perpendicular to the figure than the other direction, because stripe grooves are formed at their rear planes. Then, in order to improve the efficiency of the light utilization, the direction of the stripe grooves having the larger polarized component is aligned with the polarized light transmission axis of the polarizer of the liquid crystal display element. Furthermore, in order to improve the efficiency of the light utilization remarkably, the light control axis of the light control element is arranged to intersect approximately perpendicularly with the polarized light transmission axis of the reflective polarizer. Furthermore, in order to improve the efficiency of the light utilization, the liquid crystal display elements are arranged on the collimator (illumination device), and an outer screen (or inner if the maintaining performance of the polarization is high) is arranged on the light projection side polarizer. In accordance with these features, an increase in the transmission light of the liquid crystal display element and an increase in the viewing angle become possible. For the above screen, a screen is used which absorbs external light, transmits perpendicular transmission light of the liquid crystal display element efficiently, and absorbs oblique incident light.

Furthermore, in a case when a reflective color selective means is applied in order to decrease the absorption loss of the absorption type color filter, and to improve the efficiency of the light utilization, the arrangement in consideration of the polarizing axis as in the above compositions is desirable.

Hereinafter, a practical embodiment of the present invention will be explained.

A first embodiment of the present invention will be explained with reference to FIG. 1.

The present embodiment comprises an illumination device 50 providing particularly collimated light arranged in a lateral direction of the figure, the reflective polarizer 31 indicated in FIG. 10 comprising a dielectric multilayered film as the reflective polarizing selective means 30, the liquid crystal display element 20, the light control element 40, the birefringent medium 60, and the screen 10 having a wide viewing angle.

As the illumination device 50 which is used in the present embodiment, any edge light type back light or direct-below type back light can be used. The illumination device 50 relating to the present embodiment is composed in a manner that, for instance, definite fine grooves in a perpendicular direction to the figure are provided at the rear plane of the waveguide 53, as indicated in FIG. 1, and metal (aluminum, silver, and the like) having a high reflective index is used for the rear plane reflector 54 in order to ensure that the light projected from the light source 51 will have a directivity at least in an uniaxial direction. A component projected to the left-declined portion at the rear plane of the conductive body 53, among the light projected from the light source 51, is reflected and projected upwards as highly directed light(in a lateral direction of the figure). On the other hand, the component projected to the right-declined portion is propagated through the waveguide 53 to make the light in the plane uniform. In accordance with the waveguide having stripe grooves as in the present embodiment, the polarized light component perpendicular to the figure is enhanced. Accordingly, a desirable result can be obtained by arranging the lower polarizer 14B of the liquid crystal display element 20 in a direction parallel to the direction of the stripe grooves of the waveguide. The overall construction will be explained later.

The illumination device of the present embodiment is composed in such a manner that the light source 51 extends in a direction perpendicular to % the figure, and the reflector 52 is arranged around the light source so that the light 110 projected from the light source 51 is directed to the waveguide 53. Cold cathode fluorescent lamps were used as the light source 51, but the light source is not restricted in this regard. Because the screen 10 is arranged at the display plane side, it is necessary to improve the transmittance, to eliminate color mixing of the oblique incident light, and to give the light a directivity at least in a lateral direction of the figure. Therefore, the illumination device 50 of the present embodiment was composed so as to be capable of making the light projected from the waveguide 53 have a directivity at least in a lateral direction of the figure by forming fine grooves at the rear plane of the waveguide 53, which is composed of transparent acrylic resin, as indicated in FIG. 7 to FIG. 9.

In this embodiment, the incident light to the declined portion 53B of the fine grooves, among the incident light 110 to the waveguide 53, is reflected by the declined angle 53D and is projected from the waveguide 53 as the projected light 110A. On the other hand, the incident light to the flat portion 53A of the fine structure is totally reflected due to TIR, is propagated to the right as seen in the figure through the waveguide 53, and is projected as the projected light 110A only when the incident light is directed to a declined portion. The fine structure at the rear plane of the waveguide 53 had a pitch 53C of 200 μm, and a declined angle 53D of 40 degrees. However, the pitch 53C can be in the range of approximately 10 μm–1000 μm, and the declined angle 53D can be in the range of approximately 20 degrees–50 degrees.

Figure 30:
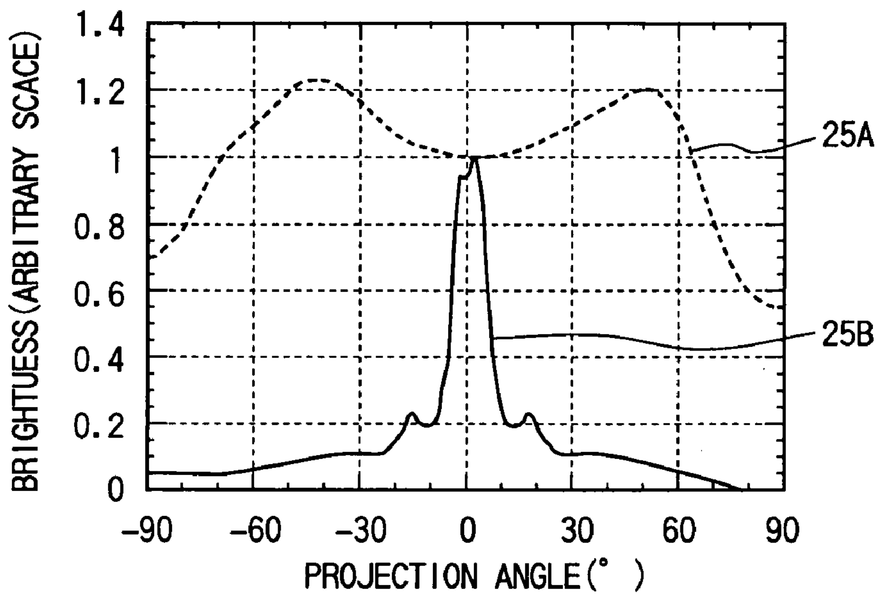
FIG. 30 is a graph indicating characteristics of the illumination device of the present invention.
Figure 31:
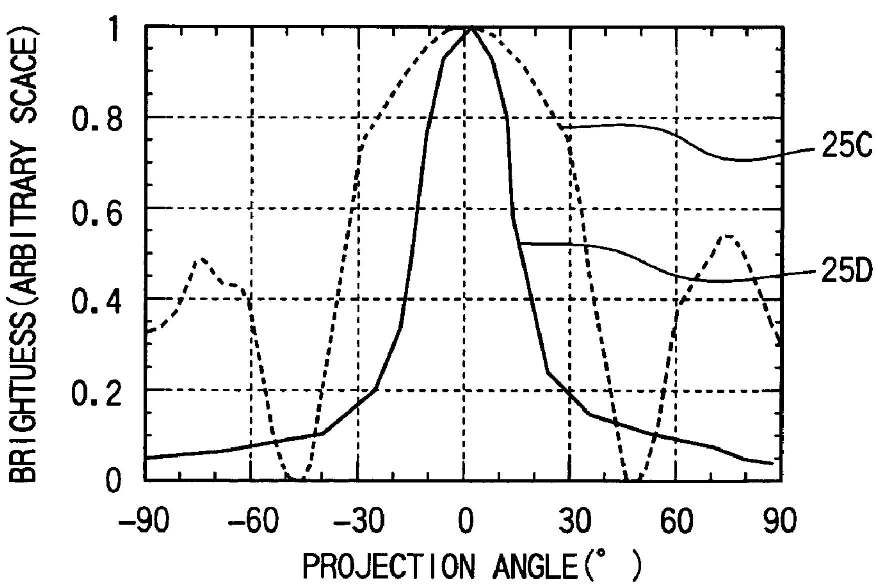
FIG. 31 is a graph indicating characteristics of the illumination device of the present invention.
Figure 32:
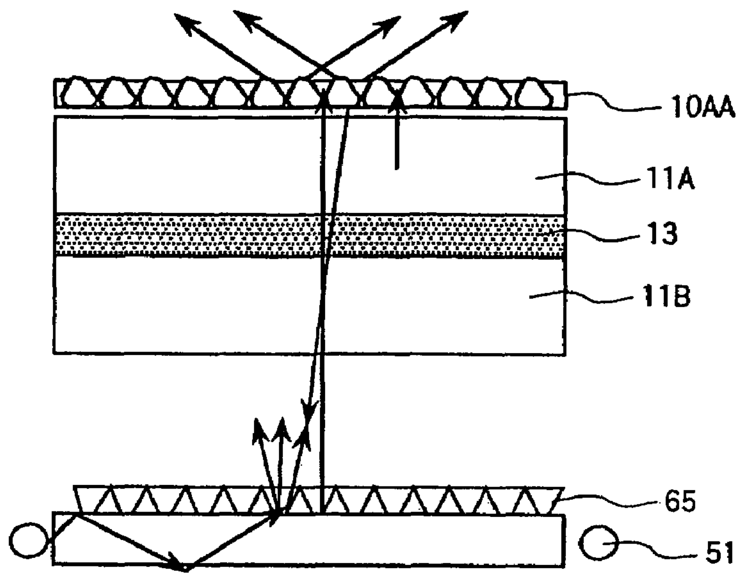
FIG. 32 is a cross section of a conventional liquid crystal display device.

Projection characteristics of the illumination device 50 used in the present embodiment are indicated in FIG. 30. The characteristics in a vertical direction in the figure are shown at 25A, and the characteristics in a lateral direction in the figure are shown at 25B, indicating that an illumination device having a high directivity in a uniaxial direction could be realized. Furthermore, FIG. 31 shows the projection characteristics when light control elements in a stripe shape 40 (commercial name of the 3M company is BEF) having an apex angle of approximately 90 degrees are applied in such a manner as to intersect the stripe grooves of the waveguide 53 perpendicularly. The characteristics in a vertical direction in the figure are shown at 25C, and the characteristics in a lateral direction in the figure are shown at 25D, indicating that a illumination device having a high directivity in a direction perpendicular to the figure could be realized. In accordance with the present embodiment, the direction providing a high directivity was aligned with the minor axis of the pixel of the liquid crystal display element.

The liquid crystal display element 20 includes a pair of transparent substrates 11A, 11B; a liquid crystal layer interposed between the pair of transparent substrates; stripe shaped color filters 12 arranged in a direction perpendicular to the figure; absorption type polarizers 14A and 14B on the projection side substrate 11A and incident side polarizer 11B, respectively; and a screen 10. Here, the liquid crystal layer 13 was a twisted nematic layer having a twist of 90 degrees and an anisotropic index of refraction And of 0.4 μm. Both of the transparent substrates 11A, 11B were made of a glass, such as Corning 7059, and its thickness was 0.7 mm. The screen 10 must maintain polarization when it is arranged at the inside of the absorption type polarizer 14A. As the absorption type polarizer, the polarizer G1220DU made by Nitto Denko Co. was used. In FIG. 1, in order to align the liquid crystal in a definite direction, an alignment layer, electrodes for applying electric fields to the liquid crystal layer, a switching element, wiring, and elements are provided, but not shown in the drawing. The size of a pixel was 100 μm×300 μm for each of the pixels RGB. The pixel was arranged so that the major axis was directed in a direction perpendicular to the figure. As the liquid crystal layer 13, any one of homogeneous directivity, twisted directivity, and homeotropic directivity can be used for initial directivity (no voltage is applied). Any one of the homogeneous directivity and the twisted directivity can be used for the liquid crystal having a positive dielectric anisotropy, and the homeotropic directivity is used for the liquid crystal having a negative dielectric anisotropy. The twisted directivity is represented by the twisted directivity of 90 degrees, but the invention is not restricted thereto.

Figure 2:
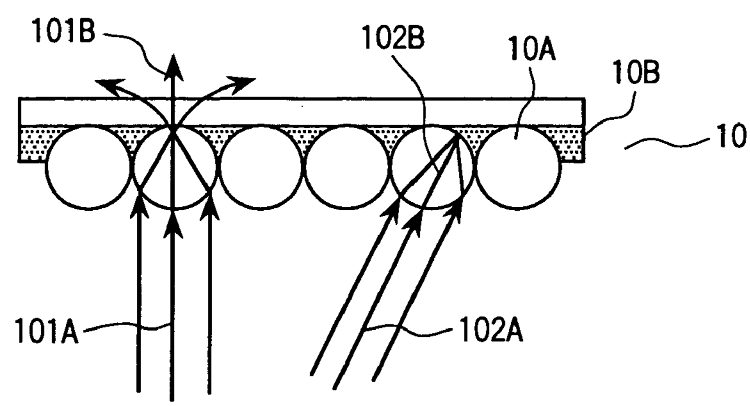
FIG. 2 is a cross section of the screen applied to the liquid crystal display device of the present invention.
Figure 3:
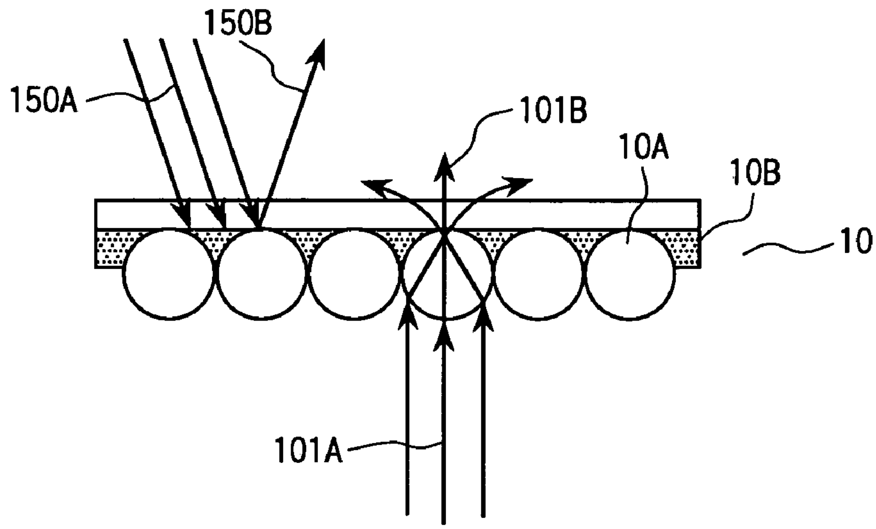
FIG. 3 is a cross section of the screen applied to the liquid crystal display device of the present invention.
Figure 4:
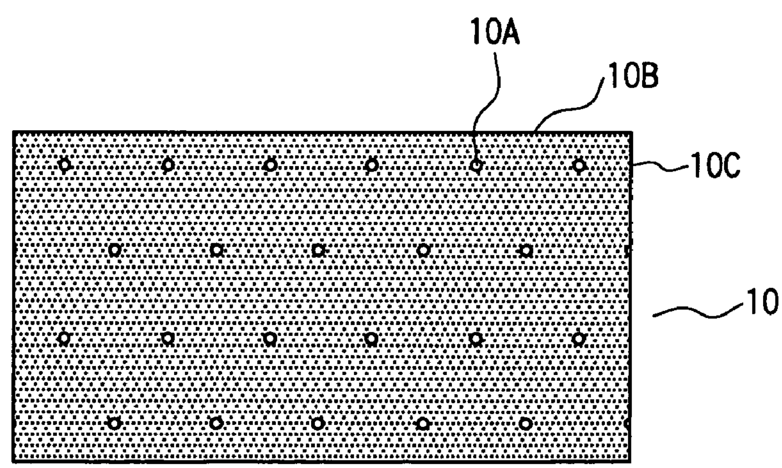
FIG. 4 is a plan view of the screen applied to the liquid crystal display device of the present invention.

Details of the screen 10 of the present embodiment are indicated in FIG. 2–FIG. 4.

The screen 10 is formed of members a spherical shape, such as beads 10A having an index of refraction of 1.7, and black absorbers 10B. In the screen 10, the beads 10A and the black absorbers 10B are arranged so as to form a very close packing structure, as indicated in FIG. 4. When the screen 10 is viewed from the light projection side, small apertures indicated by 10C are distributed, and other regions are occupied with the black absorber 10B. Incident light 101A at a normal angle to the screen 10 is focused to the aperture 10C, depending on the incident angle to the beads 10A and the index of refraction, and is projected at 101B with a broadened pattern from the screen 10. On the other hand, incident light 102A which is oblique to the screen 10 is absorbed by the black absorber 10B and is not projected. Accordingly, in accordance with the above composition, the oblique incident light, which decreases the resolution of the image, can be absorbed. Although the display is used in an environment such as an office environment in the presence of an ambient light, almost all the ambient light 150A is absorbed, because the screen 10 is mostly covered with the absorber 10B when the screen is viewed from the display plane side, as indicated in FIG. 3 and FIG. 4, and only a reflection component 150B from the aperture 10C is reflected. Accordingly, a screen can be obtained wherein the black brightness of the display is increased, and the contrast ratio is not decreased, even in an environment in the presence of ambient light. In accordance with the present embodiment, screen arranging spherical beads was used, but a semi-spherical micro-lens array could be used. Furthermore, for instance, a stripe shaped rod-lens having a widening effect on the viewing angle at least in a direction having a strong directivity of the illumination device 50 may be used.

Figure 39:
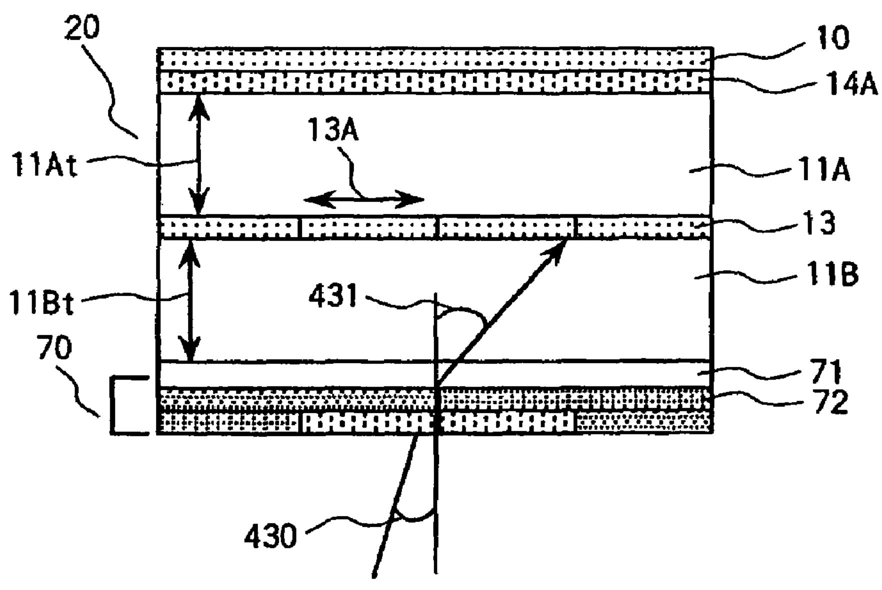
FIG. 39 is a diagram indicating a composition of the conventional liquid crystal display device.

In accordance with the present embodiment, the stripe groove direction of the waveguide 53 was arranged to intersect perpendicularly with the groove direction of the light control element 40 and the stripe groove direction of the waveguide 53 was aligned in parallel with the direction of the polarized light transmission axis of the reflective polarizer 30. Because the light 110A projected from the waveguide 53 contains a large portion of light polarized in a direction perpendicular to the figure, and the polarized light transmission axis of the reflective polarizer 30 is aligned with it, the light 110A is transmitted as light 110B efficiently and is projected into the liquid crystal display element 20. Furthermore, because of the way the conversion axis of the light control element 40 is aligned, the reflected light 110C, i.e. a linearly polarized light intersecting perpendicularly with the light 110B, is converted effectively to circularly polarized light by the birefringent medium 60. Then, the circularly polarized light is reflected by the reflector 54, transmitted through the birefringent medium 60 again so as to become linearly polarized light 110D, which is the same as the light 110B, and becomes light 110E incident to the liquid crystal display element 20. As a result, the efficiency of the light utilization can be increased by 20% or more in comparison with the structures indicated in FIG. 39 and FIG. 41. The resolution of the display device of the present embodiment was high, and a display having a wide viewing angle, in comparison with the conventional liquid crystal element, no grayscale reversal, which was scarcely observed on conventional liquid crystal element, and a color shift and contrast ratio scarcely depending on the viewing angle, could be obtained.

Figure 5:
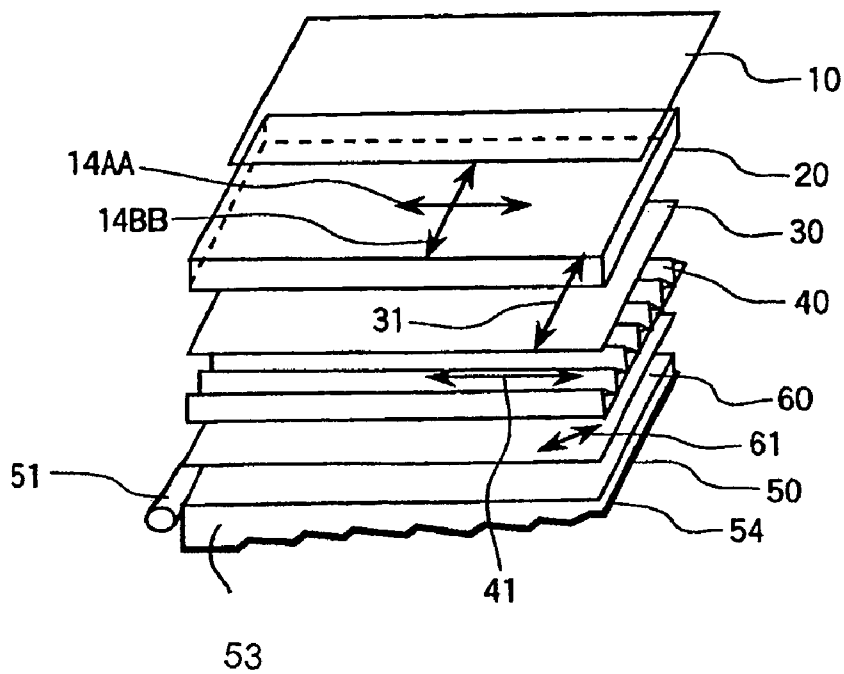
FIG. 5 is a partial, exploded view of the liquid crystal display device representing an embodiment of the present invention.
Figure 6:
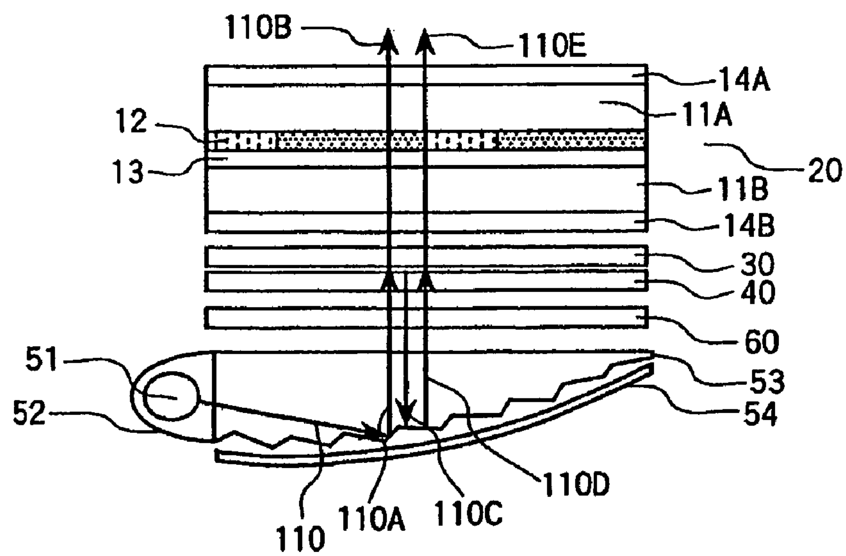
FIG. 6 is a cross sectional view of the liquid crystal display device representing an embodiment of the present invention.

Details of the embodiment in FIG. 1 are indicated in FIG. 5 and FIG. 6.

In the present embodiment, the slow axis 61 of the birefringent medium 60 is arranged so as to form an angle of approximately 45 degrees with the fine stripe groove direction of the illumination device 50, and the stripe groove direction 41 of the light control element 40 is arranged so as to be approximately in parallel with the fine stripe groove direction of the waveguide 53. As a result, the illumination device 50 has a high collimated light in the stripe groove direction 41 and an enhanced collimation in the polarized light transmission direction 14AA. Because the light projected from the waveguide 53 has a high polarized light component in the stripe groove direction, the birefringent medium 60 may be arranged between the waveguide 53 and the reflector 54. The polarized light transmission axis 14BB of the incident side reflector of the liquid crystal display element 20 was arranged to intersect perpendicularly with the polarized light transmission axis 14AA of the projection side reflector, as indicated in FIG. 5, the polarized light transmission axis 31 of the reflective polarizer 30 was arranged to be approximately in parallel with the axis 14BB, and the polarized light transmission axis 31 was arranged so as to intersect perpendicularly with the stripe groove direction 41 of the light control element 40, in the present embodiment. As a result of such an arrangement, the light projected from the waveguide 53 is converted to the projected light 110B, 110E, on which the polarizing conversion can be performed effectively by only a single cycle of the processes of light 110C, 110D, as stated previously. When the light control element 40 has birefringence, it is desirable to make the light control element 40 and the birefringent medium 60 operate as a quarter wave plate, or to align the optical axis with the linearly polarized direction so as to make the birefringence of the light control element 40 be negligible.

In the embodiment indicated in FIG. 1, the polarizer 31 of type 1 indicated in FIG. 10 was used as the reflective polarizer 30. However, the most optimum structure uses the reflective polarizer type 2, when the light control element is used, and its detailed embodiments are illustrated in FIG. 15 and FIG. 16.

First, an illumination device using the reflective polarizer 31 of type 1 as the reflective polarizer 30 will be discussed with reference to FIG. 15.

The cross section of the present embodiment differs from the cross section indicated in FIG. 1 in its cutting direction, is that it shows the cross section in a direction rotated 90 degrees at the azimuthal angle from the cross sectional direction indicated in FIG. 1.

Figure 15:
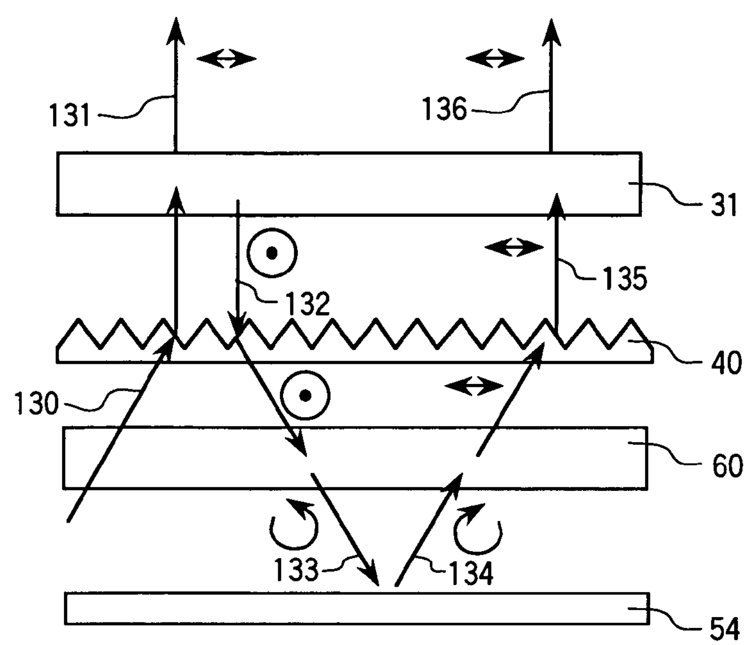
FIG. 15 is a diagram indicating an operation of the liquid crystal display device of the present invention.
Figure 16:
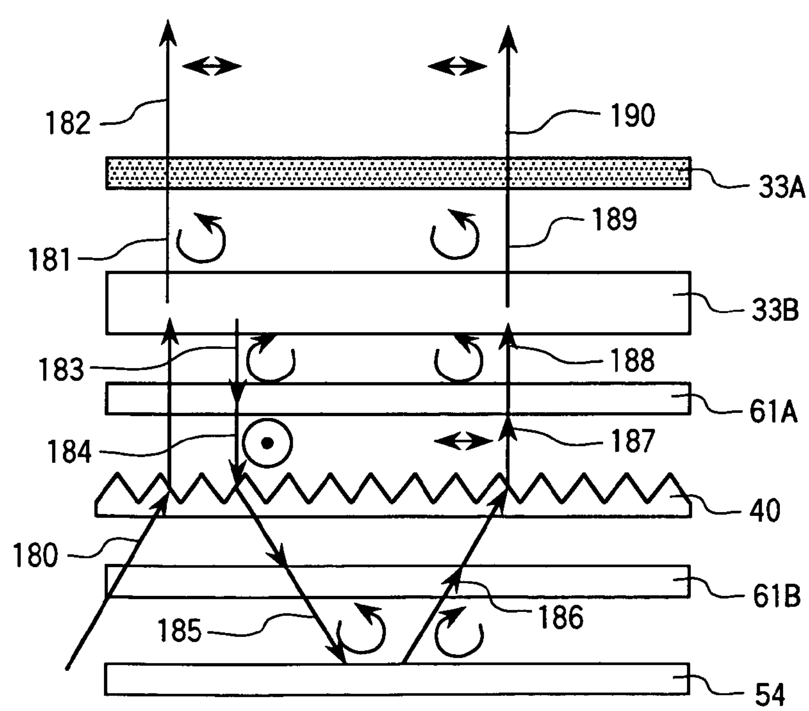
FIG. 16 is a diagram indicating an operation of the liquid crystal display device of the present invention.

The arrangement indicated in FIG. 15 comprises a reflector 54 arranged at the rear plane of the waveguide, birefringent medium 60, light control element 40, and reflective polarizer 31 arranged on the waveguide.

The light 130 projected from the waveguide is projected light having a large polarized component in parallel to the figure, which is directed toward a normal angle by the light control element 40 and is transmitted as light 131 through the reflective polarizer 31. On the other hand, the linearly polarized light 132 intersecting perpendicularly with the transmitted light 131 is reflected by the reflective polarizer 31, is transmitted and refracted by the light control element, and becomes circularly polarized light 133 when passing through the birefringent medium 60. At that time, the birefringent medium 60 operates as a quarter wave plate to the oblique incident light. The circularly polarized light 134 reflected from the reflector 54 is circularly polarized light rotated in a direction reverse to the circularly polarized light 133. The circularly polarized light 134 is converted to linearly polarized light by the birefringent medium 60 and is refracted by the light control element 40. The refracted light 135 has the same transmission axis as the polarized light transmission axis of the reflective polarizer 31 and becomes the projected light 136. As described above, the polarizing conversion can be realized effectively by only a single reflection cycle.

Next, the illumination device using the reflective polarizer 33 of type 2 as the reflective polarizer 30 will be discussed with reference to FIG. 16.

The cross section of the present embodiment indicates the cross section in a direction rotated 90 degrees in azimuthal angle from the cross sectional direction indicated in FIG. 1, and is the same cross section as FIG. 15.

The arrangement comprises a reflector 54 arranged at the rear plane of the waveguide, birefringent medium 61A, 61B, light control element 40, retardation plate 33A forming the reflective polarizer 33, and cholesteric layer 33B arranged on the waveguide.

The light 180 projected from the waveguide is projected light having a large polarized component in parallel to the figure, which is directed toward the normal angle by the light control element 40, transmitted as light 181 through the cholesteric layer 33B and converted to linearly polarized light 182 by the retardation plate 33A. On the other hand, the circularly polarized light 183, rotated in a direction reverse to the transmitted light 181, as reflected by the cholesteric layer 33B, converted to linearly polarized light 184 by the birefringent medium 61A, transmitted and refracted by the light control element 40, and becomes circularly polarized light 185 when passing through the birefringent medium 61B. At that time, the birefringent medium 61B operates as a quarter wave plate to the oblique incident light. The circularly polarized light 186 reflected from the reflector 54 is circularly polarized light rotated in a direction reverse to the circularly polarized light 185. The circularly polarized light 186 is converted to linearly polarized light 187 by the birefringent medium 61B and is refracted by the light control element 40. The refracted light 187 is converted to circularly polarized light 188 by the birefringent medium 61*a* and is transmitted through the cholesteric layer 33B as circularly polarized light 189. The circularly polarized light 189 becomes the same linearly polarized light 190 as the light 182 transmitted by the retardation plate 33A and is projected. As described above, the polarizing conversion can be realized effectively by only one cycle of reflection.

An embodiment for obtaining a bright display with low power consumption by eliminating absorption loss by the conventional color filters and for improving the efficiency of light utilization will be described hereinafter.

Figure 17:
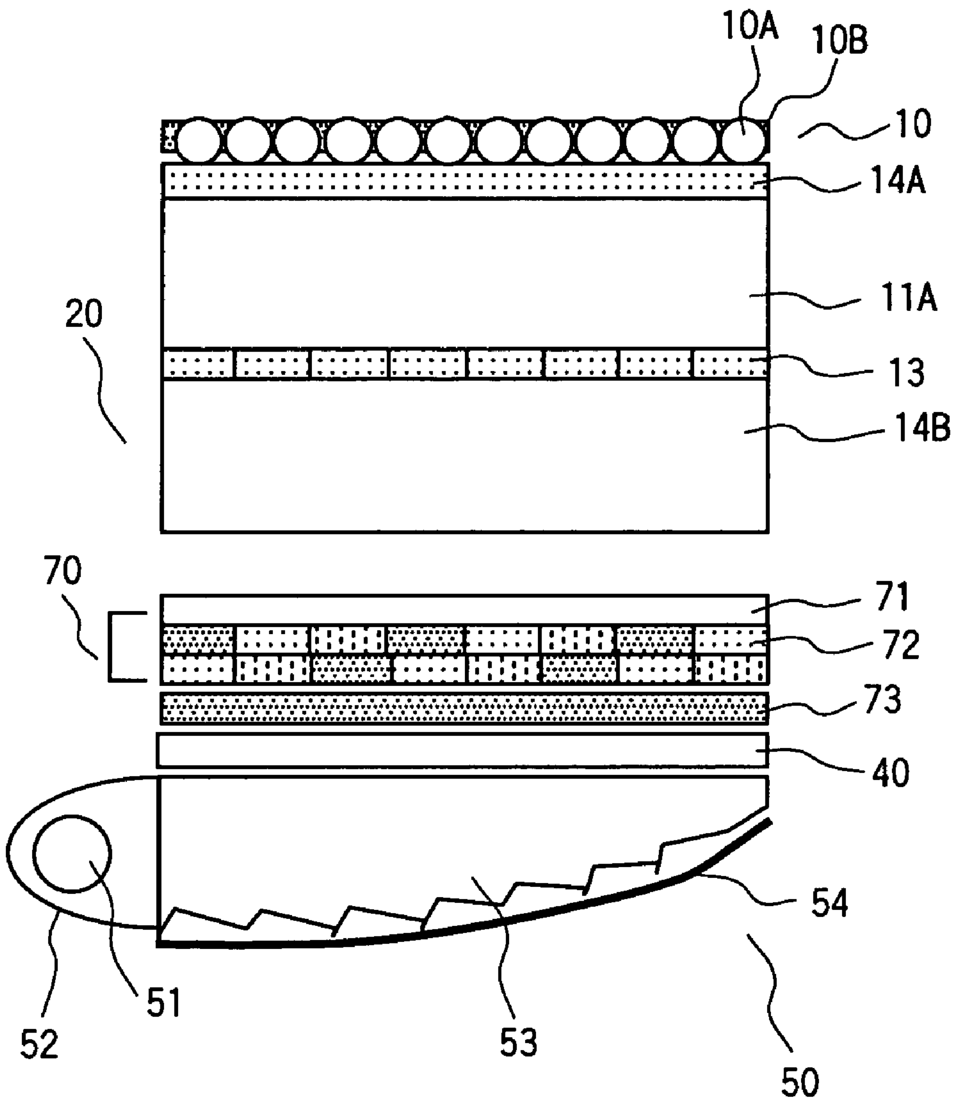
FIG. 17 is a cross section of the liquid crystal display device representing an embodiment of the present invention.

The configuration of the embodiment, as seen in FIG. 17, comprises cholesteric layer 73, two layered cholesteric layer 72 having a twist reverse to the cholesteric layer 73 operating as a reflective color selective layer 70, a retardation plate 71 operating as a quarter wave plate, and screen 10 arranged at the upper portion of the liquid crystal display element 20. Other components are the same shown in as FIG. 1 and FIG. 20.

In FIG. 17, the reflective color selective layer 70 transmits specified polarized light having a specified wavelength, and reflects light other than the specified polarized light. For instance, the reflective color selective layer 70 transmits one of the three primary colors, i.e. red, green, and blue, and reflects the other colors. The cholesteric layer 73 transmits one of circularly polarized light in at least the visible wavelength region, and reflects other circularly polarized light. As described above, the liquid crystal layer display device capable of re-utilizing light reflected from each of the layers 70, 73, having a low absorption loss and a high efficiency of light utilization can be realized by arranging the cholesteric layer 73, the reflective color selective layer 70, and the liquid crystal display element 20 on the illumination device 50.

Next, an embodiment of the liquid crystal display device using the illumination device indicated in FIG. 21 will be explained with reference to FIG. 20.

Figure 21:
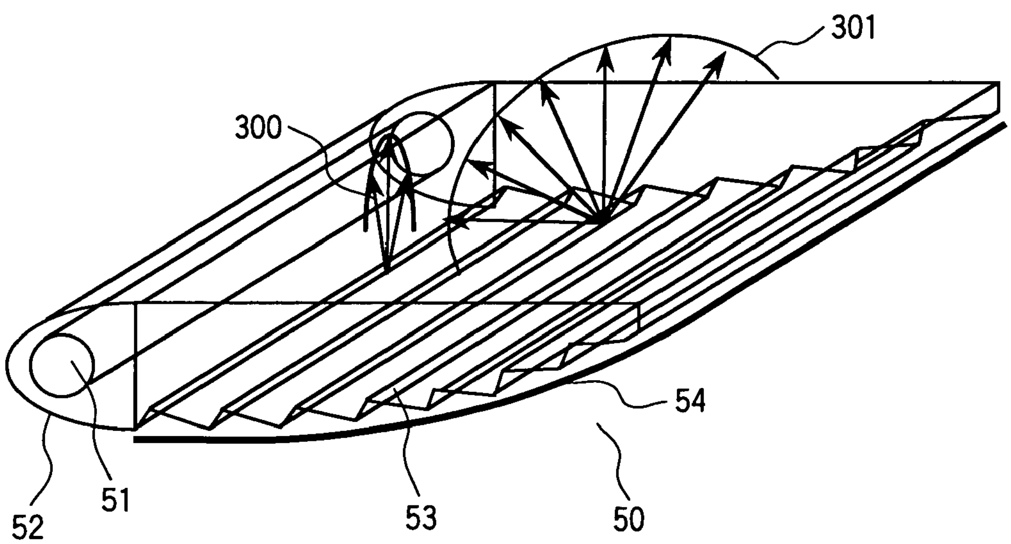
FIG. 21 is a partial, sectional perspective view of the illumination device representing an embodiment of the present invention.

The illumination device relating to the present embodiment has a composition comprising stripe shaped microgrooves provided at a rear plane of the waveguide 53, as indicated in FIG. 21, a light source 51 and a lamp cover 52 provided at a side plane of the waveguide 53, and a reflector 54 arranged at the rear side of the waveguide 53.

The projection characteristics of the illumination device 50 of the present embodiment include a high directivity in a direction intersecting perpendicularly with the stripe shaped grooves, and an extension in a direction in parallel with the stripe shaped grooves. The projection characteristics are indicated qualitatively as 300, 301 in FIG. 21.

The projection characteristics of the illumination device 50 shown in FIG. 21 are indicated in FIG. 30.

The characteristics in the direction in parallel with the direction of the stripeshaped fine grooves in the waveguide 53 are indicated at 25A, and the characteristics in the direction perpendicular to the above are indicated at 25B. In accordance with FIG. 30, it can be seen that the collimation at all azimuth angles was sufficiently enhanced.

Figure 20:
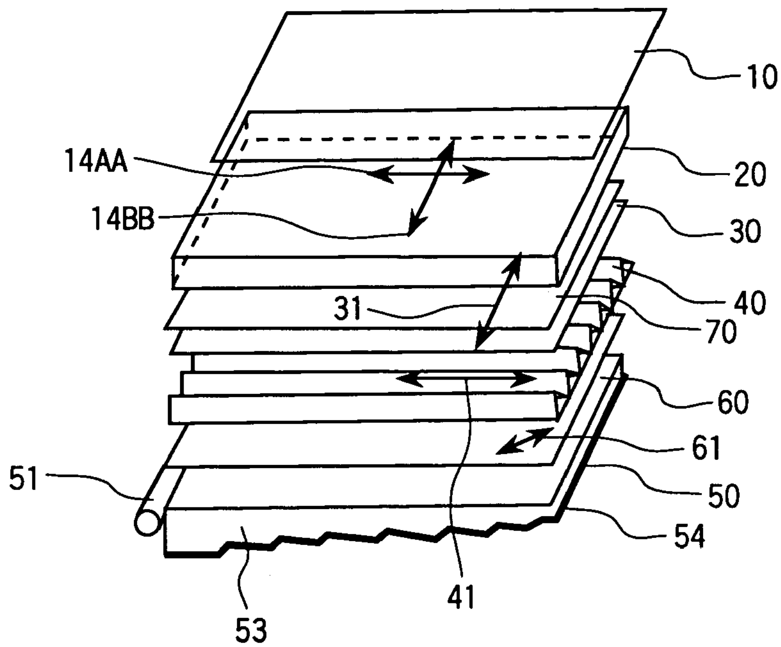
FIG. 20 is a partial, exploded view of the liquid crystal display device representing an embodiment of the present invention.

An embodiment using the illumination device 50 is illustrated in FIG. 20.

The direction of the stripe shaped grooves of the waveguide 53 is arranged to intersect perpendicularly with the groove direction of the light control element 40, and the direction of the stripe shaped grooves of the waveguide 53 is aligned with the direction of the polarized light transmission axis of the reflective polarizer 30. The polarized light component in the direction parallel with the stripe shaped groove in the light projected from the waveguide is significant, and this light component is transmitted effectively because it is aligned with the direction of the polarized light transmission axis of the reflective polarizer 30, and projected into the liquid crystal display element 20. The conversion axis of the light control element 40 is composed so as to be approximately in parallel with the polarized light transmission axis of the reflective polarizer 30. In accordance with this arrangement, the polarizing conversion can be achieved effectively and the efficiency of the light utilization can be increased significantly, because the direction a high polarized light component from the waveguide 53 is coincident. The resolution of the display device of the present embodiment is high, and so a display having a wide viewing angle in comparison with the conventional liquid crystal element, no grayscale reversal which is scarcely observed on conventional liquid crystal element, and a color shift and contrast ratio scarcely depending on the viewing angle can be obtained.

Next, the operation of the reflective color selective means 70 and the reflective polarizing selective means 73 relating to the present invention will be explained in more detail with reference to FIG. 18.

As an example of the reflective color selective means 70, cholesteric layers 72A–72C utilizing the selective reflection properties of the cholesteric material, and a retardation plate 71 operating as a quarter wave plate are used. The retardation plate 71 may be arranged for every color in the same manner as the cholesteric layer 72 in order to operate as a quarter wave plate for every color. As the reflective polarizing light selective means 73, for instance, the cholesteric layer having a specified reflection for at least three primary colors is used, and the cholesteric layer 73 has a twist reverse to the cholesteric layers 72A–72C. The cholesteric layers 72A–72C operating as the reflective color selective means 70, the retardation plate 71, and the cholesteric layer operating as the reflective polarizing light selective means are arranged on the illumination device comprising wave guide means and the reflection means.

Using the cholesteric layer as the reflective polarizing light selective means 73 has been known, and the technology disclosed in JP-A-3-45906 (1991) and JP-A-6-324333

(1994) can be applied. Selective reflection wavelength λ by the cholesteric layer can be expressed by the following equation:

$$\lambda=(n_0+n_1)/2P.$$

The selective reflection wavelength λ is determined by the cholesteric spiral pitch P, and the index of refraction of ordinary light $n_0$ and of extraordinary light $n_e$. Selective reflection band $\Delta\lambda=\Delta nP$ is determined by an anisotropy of refractive index $\Delta n=n_e-n_0$ and the spiral pitch P. However, Δn is approximately 0.3, and so all of the visible region can not be covered. Accordingly, all of the visible region must be covered by laminating several cholesteric layers having different pitches, or by varying the pitch in the cholesteric layer. As materials for the cholesteric layers 72A–72C operating as the reflective color selective means 70, the same materials as the reflective polarizing light selective means 73 can be used, and the spiral pitch for each of the layers is set so as to produce a specified reflection, such as red, green, and blue. Although the selective reflection center wave-length and the selective reflection band are not restricted, each center wave length for the respective colors is desirably selected as 470 nm, 550 nm, and 620 nm, and the desirable specified reflection band is approximately ±35 nm.

Conveniently, the cholesteric layers 72A–72C are assumed to be twisted right-handed, and the cholesteric layer 73 used as the reflective polarizing light selective means 73 is assumed to be twisted left-handed. Accordingly, the cholesteric layer 73 reflects the left-handed circularly polarized light and transmits the right-handed circularly polarized light. Each of the cholesteric layers 72A–72C reflects the right-handed circularly polarized light of the red color, green color, and blue color, respectively, and transmits the other colors.

The light 200 projected from the waveguide means made of transparent acrylic resin is white non-polarized light, which is projected into the cholesteric layer 73, i.e. the reflective polarizing light selective means. Then, the transmitted light becomes white right-handed circularly polarized light 201, and the reflected light becomes white left-handed circularly polarized light 203. The white right-handed circularly polarized light 201, i.e. the transmitted light, is projected into the cholesteric layers 72A, 72C, where right-handed circularly polarized light 202 of green color is transmitted, and blue and red color right-handed circularly polarized light 206 are reflected. The transmitted green color right-handed circularly polarized light 202 becomes green color linearly polarized light 213 by action of the retardation plate 71.

On the other hand, the reflected white left-handed circularly polarized light 203 is further reflected by the reflecting means 54 arranged at the rear plane of the waveguide means so as to become left-handed circularly polarized light 204, and is transmitted through the cholesteric layer 73. The white right-handed circularly polarized light 204 transmitted through the cholesteric layer 73 is projected into the cholesteric layers 72B, 72C, and only red color right-handed circularly polarized light 205 is transmitted and the other left-handed circularly polarized light 211 is reflected. The transmitted red color right-handed circularly polarized light 205 is converted to red color linearly polarized light 214 having the same polarizing axis as the green color linearly polarized light 213 by the retardation plate 71.

The reflected blue color and red color right-handed circularly polarized light 206 is reflected by the reflection means 54 to be blue color and red color left-handed circularly polarized light 207, is reflected by the cholesteric layer 73 as blue color and red color left-handed circularly polarized light 208 and is reflected by the reflection means 54 again to become right-handed circularly polarized light 209. The right-handed circularly polarized light 209 is transmitted through the cholesteric layer 73, projected into the cholesteric layers 72A, 72B, and only blue color right-handed circularly polarized light 210 is transmitted through the cholesteric layers and the rest is reflected. The transmitted blue color right-handed circularly polarized light 210 is converted to linearly polarized light 215 having the same direction as the linearly polarized light 213, 214 by the retardation plate 71. Here, an example was considered for a case where the waveguide means 53 and the reflection means 54 did not have any depolarization by scattering. However, when depolarization exists, the light can be reutilized by repeating transmission of only a desired polarized light component and reflection of an undesired polarized light component.

The reflected light 211, 212 by the cholesteric layer, i.e. a reflective color selective layer, can be reutilized by the same phenomena as described above.

Operations of the reflective color selective means 70 and the reflective polarizing selective means 73 will be explained hereinafter.

As an example of the reflective color selective means 70, the dielectric multilayered film 74A–74C is utilized. The dielectric multilayered film transmits one of perpendicularly intersecting linearly polarized light components and reflects the rest of the linearly polarized light components. As the reflective polarizing selective means, the dielectric multilayered film 73B is used. The reflective polarizing selective means transmits one of perpendicularly intersecting linearly polarized light components for the three primary colors and reflects the rest of the linearly polarized light components. The dielectric multilayered film 74A–74C and the dielectric multilayered film 73B are arranged so that the polarizing axis of their polarized light components are approximately the same. The dielectric multilayered film 74A–74C operating as the reflective color selective means 70 and the dielectric multilayered film 73B operating as the reflective polarizing selective means are arranged on the illumination device comprising the waveguide means and the reflection means. Desirably, the retardation plate 61C operating as a quarter wave plate to each wavelength is arranged between the dielectric multilayered film 73B and the reflection means 54. Preferably, the retardation plate 61C is used. The retardation plate is adjusted with a phase difference to each color by making its shape stripe correspond to the layers of the reflective color selective means. Furthermore, preferably, the light control element 40 may be arranged in order to enhance the directivity of the transmitted light.

Using the dielectric multilayered film as the reflective polarizing selective means has been known, and the technology disclosed, for instance, in WO95/27919 can be applied. The dielectric multilayered film 74A–74C operating as the reflective color selective means 70 can be composed of the same materials as the reflective polarizing selective means, and each of the layers is set so that one of the perpendicularly intersecting linearly polarized light components of red, green, and blue is passed and the rest of the linearly polarized light components are reflected.

Figure 19:
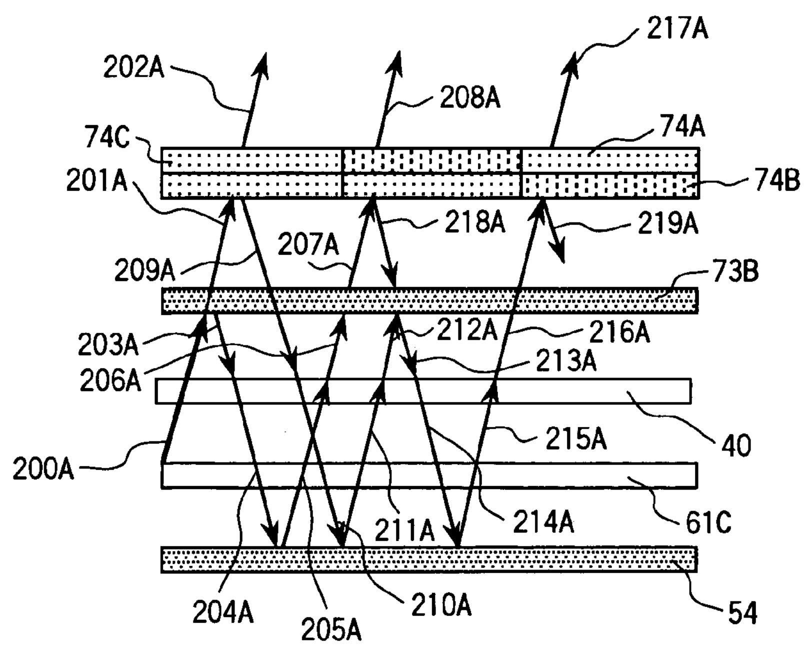
FIG. 19 is a diagram indicating an operation of the liquid crystal display device of the present invention.

For convenience of explanation, the linearly polarized light in a direction perpendicular to FIG. 19 will be expressed by the mark +, and the linearly polarized light in a lateral direction to the figure will be expressed by the mark.

The light 200A projected from the waveguide means made of transparent acrylic resin, which is white non-polarized light, is projected into the dielectric multilayered film 73B, i.e. the reflective polarizing selective means. Then, the transmitted light becomes white linearly polarized light +201A, and the reflected light becomes white linearly polarized light –203A. The white linearly polarized light +201A, i.e. the transmitted light, is projected into the dielectric multilayered film layers 74A, 74C, where green color linearly polarized light +202A is transmitted, and blue and red color linearly polarized light +209A are reflected.

On the other hand, the reflected white linearly polarized light 203A is converted to right-handed circularly polarized light 204A by the retardation plate 61C, is reflected by the reflection means 54 arranged at the rear plane of the waveguide means 53 so as to become left-handed circularly polarized light 205A, is transmitted through the retardation plate 61C so as to be converted to linearly polarized light +206A, and is transmitted through the dielectric multilayered film layer 73B to become linearly polarized light +207A. The linearly polarized light +207A transmitted through the dielectric multilayered film layer 73B is projected into the dielectric multilayered film layers 74B, 74C, where only red color linearly polarized light +208A is transmitted and the other linearly polarized light +218A is reflected and re-utilized by the same processes.

The reflected blue color and red color linearly polarized light +209A is converted to left-handed circularly polarized light 210A by the retardation plate 61C, is reflected by the reflection means 54 to become blue color and red color right-handed circularly polarized light 211A, is projected again through the retardation plate 61C to become linearly polarized light –212A. The linearly polarized light –213A reflected by the dielectric multilayered film layer 73B is converted to right-handed circularly-polarized light 214A by passing through the retardate on plate 61C, is reflected by the reflection means 54 so as to become left-handed circularly polarized light 215A, is transmitted through the retardation plate 61C again to become linearly polarized light +216A, and is transmitted through the dielectric multilayered film layer 73B. The linearly polarized light +216A, i.e. the transmitted light, is projected into the dielectric multilayered film layers 74A, 74B, where only the blue color linearly polarized light is transmitted through the dielectric multilayered film and the rest is reflected so as to become reflected light 219A, which is re-utilized by the same principle. Here, an example was considered for a case where the waveguide means and the reflection means 54 did not have any depolarization by scattering. However, when depolarization exists, the light can be re-utilized by repeating transmission of only a desired polarized light component and reflection of an undesired polarized light component.

Figure 18:
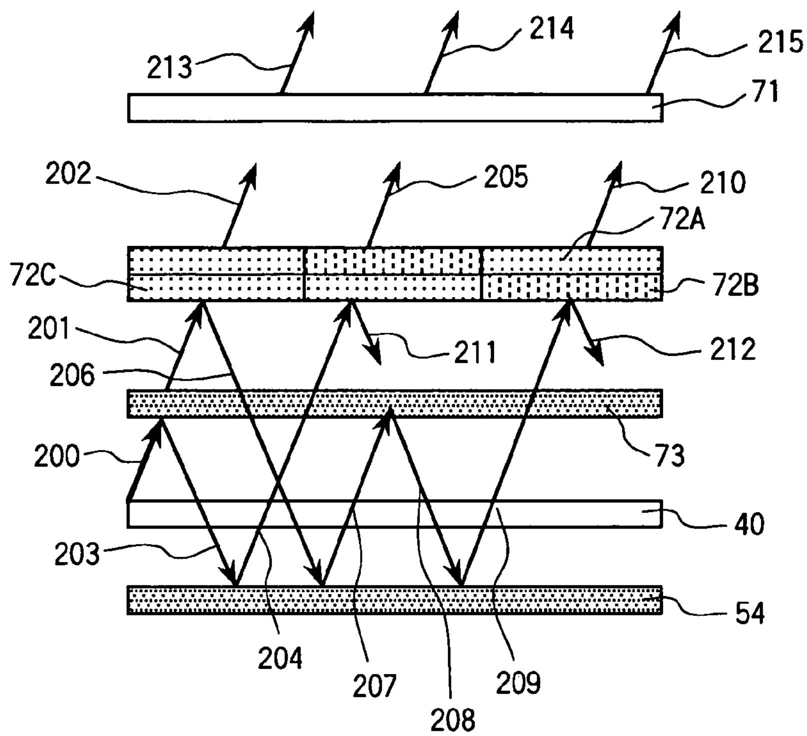
FIG. 18 is a diagram indicating an operation of the liquid crystal display device of the present invention.

The operations of the reflective color selective means 70 and the reflective polarizing selective means 73 have been explained as above with reference to FIG. 18 and FIG. 19. However, the cholesteric layer for the reflective color selective means 70 and the dielectric multilayered film layer for the reflective polarizing selective means 73, or the dielectric multilayered film layer for the reflective color selective means 70 and the cholesteric layer for the reflective polarizing selective means 73, can be used, and the combination is not restricted by the above explanation.

Figure 26:
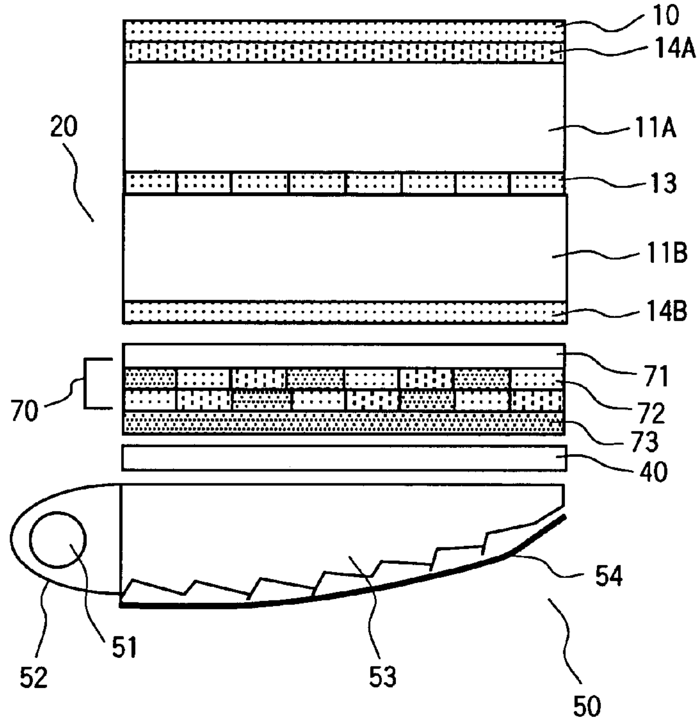
FIG. 26 is a cross section of the liquid crystal display device indicating an embodiment of the present invention.

Because the viewing angle characteristics of the reflective polarizing selective means 73, as explained above with reference to FIG. 18 and FIG. 19, is generally inferior to the absorption type polarizer (the polarization is shifted from the desired polarization by oblique incident light), it is desirable to arrange an absorption type polarizing selective means 14B at the incident light plane of the liquid crystal element, as indicated in FIG. 26, if necessary, in matching the collimation of illuminated light from the illumination device. Furthermore, because the viewing angle characteristics of the reflective color selective means 70 are generally undesirable, and the polarization is shifted from the desired polarization by oblique incident light, it is desirable to provide color filters as the absorption type color selective means in the liquid crystal element, if necessary, in matching the collimation of illuminated light from the illumination device. Furthermore, in order to compensate the viewing angle dependence of the reflective color selective means 70, it is desirable to use the screen indicated in FIG. 2–FIG. 4 for absorbing the oblique incident light. In order to compensate the viewing angle dependence of the reflective color selective means 70, a pigment and the like for absorbing colors other than the desired color can be used by mixing or laminating.

Furthermore, a display having a wide viewing angle and no color mixing between the reflective color selective means can be obtained by arranging the reflective color selective means in a stripe shape, by using an illumination device having an directivity of the light in a direction perpendicular to the stripe direction, by diffusing only in a direction along the directivity of the light at the display plane. When the reflective color selective means is arranged in a stripe shape, deterioration of the image quality by the mixing of colors between pixels can be eliminated with provision of no directivity of the light in the stripe direction. Not only can the amount of the projected light from the illumination device itself be increased, but also its structure can be simplified by enhancing its collimation of the illuminated light in a direction of the illumination device. For instance, the lens sheet at the upper portion of the waveguide can be eliminated by setting the stripe fine grooves of the illumination device approximately in parallel to the stripe direction of the reflective color selective means.

A change in characteristics (color shift, polarization change) of the reflective color selective means with oblique incident light can be compensated and a display having a high color reproduction with the oblique incident light can be obtained by arranging a second absorption type polarizing selective means at the liquid crystal layer side of the reflective color selective means. Even if the collimation of light sources in the stripe direction is worse, problems such as mixing of color and others can be eliminated because the colors in the stripe direction are the same color, and so a color liquid crystal display device having a high efficiency in light utilization can be realized by enhancing the directivity of the light without causing deterioration of the efficiency of the light utilization.

Further, a display having a high image quality even with the oblique incident light from the direction, where diffusion by the diffuser at the display plane is not performed, can be obtained by using a liquid crystal display mode having a wide viewing angle in the stripe direction of the reflective color selective means. Further, the composition of the illumination device can be facilitated by arranging the longitudinal direction of the lamp and the stripe direction of the color selective means to be approximately parallel to each other.

By using the above means, problems such as deterioration of the image quality depending on the thickness of the substrate, deterioration in the contrast ratio and display performance such as displayed color with the oblique incident light can be prevented, and a bright display device having a low power consumption and small absorption loss can be obtained. That is, a wide viewing angle can be realized by transmitting the light through the reflective color selective means and the liquid crystal layer so as to be approximately perpendicular to the substrate, and diffusing optically at the display plane. Therefore, the problems caused by oblique incident light, which have been problems existing for a long time, can be solved, and the display device having a wide viewing angle and no deterioration of the image quality depending on the viewing angle can be realized. Furthermore, the reflected light from the reflective color selective means and the reflective polarizing selective means can be used effectively, and the efficiency of the light utilization can be enhanced by re-utilization of the light.

Hereinafter, the advantages and the operation of the embodiment illustrated in FIG. 17, in which the reflective color selective means is used for decreasing the absorption loss of the color filters, the efficiency of the light utilization is improved, and a bright display with low consuming power is realized, will be explained. In the conventional illumination device, various problems occurs, such as unclearness of image and color mixing. Therefore, the reflective color selective layer 70 has a structure of stripe shape (pitch of 100 μmin matching with pixel)in a direction perpendicular to the figure matching the pitch of the liquid crystal layer 13. The illumination device 50 used in the present embodiment has a high directivity of light in a direction lateral to the figure, that is, projection light characteristics of highly collimated light. Accordingly, the direction perpendicular to the stripe of the reflective color selective layer 70 produces a high collimated light, the light transmitted through the reflective color selective layer 70 is transmitted through the pixel corresponding to the same color, and the light transmitted through the pixel is extended in a lateral direction to the figure by the screen 10 at the upper portion, so that a display having wide viewing angles with no unclearness in the image, no decrease in contrast ratio, and no decrease in the purity of the colors could be obtained. On the other hand, the direction perpendicular to the figure does not necessarily require a high collimation of the light source for displaying the same color, and so the projected light from the illumination device 50 can be used without collimation. However, in consideration of the viewing angle dependence of the reflective color selective layer 70, providing the directivity of the light to the illumination device is necessary. The light projected from the illumination device 50 must be directed at least in the direction in which it is collimated strongly, and the direction perpendicular to the above direction is not necessarily extended by the screen 10. Therefore, color mixing depending on the thickness of the glass substrate could be eliminated by increasing the collimation of the light at least in the direction perpendicular to the stripe of the reflective color selective layer 70, whereby a display having a wide viewing angle becomes possible. In accordance with the present embodiment, the characteristics of no color mixing and a high contrast ratio were obtained.

In accordance with the present embodiment, a display having a wide viewing angle without making the image unclear could be realized, as described above. The efficiency of the light utilization was significantly improved, because the absorption loss by the conventional polarizer and color filters was decreased. Although the light projected from the waveguide 53 is non-polarized light, one component of the circularly polarized light is transmitted through the cholesteric layer 73, and other component of the circularly polarized light is reflected. The transmitted circularly polarized light is subjected to color selection by the reflective color selective layer 72 to be transmitted only as circularly polarized light of the desired color (other color is reflected). The transmitted light is converted to linearly polarized light by the retardation plate 71, is modulated by the liquid crystal layer 13, is selected by the absorption type polarizer 14A, and is displayed corresponding to received image signals. on the other hand, other circularly polarized light reflected by the cholesteric layer 73 is further reflected by the reflector at the rear plane of the waveguide so as to become circularly polarized light in a reverse direction. The reflected circularly polarized light is transmitted through the cholesteric layer 73 and is used for the display. Similarly, the reflected light of the other color is re-utilized when projected into the desired color selective layer after repeated reflections by the reflector 54 at the rear pane of the waveguide. Accordingly, although the reflector 54 and the selective layer 72 had some absorption loss, theoretically all the light could be re-utilized, and the efficiency of the light utilization was improved remarkably. In accordance with the present embodiment, the efficiency of the light utilization was increased by approximately 3.5 times in comparison with a case having no cholesteric layer 73 or color selective layer 72.

Figure 22:
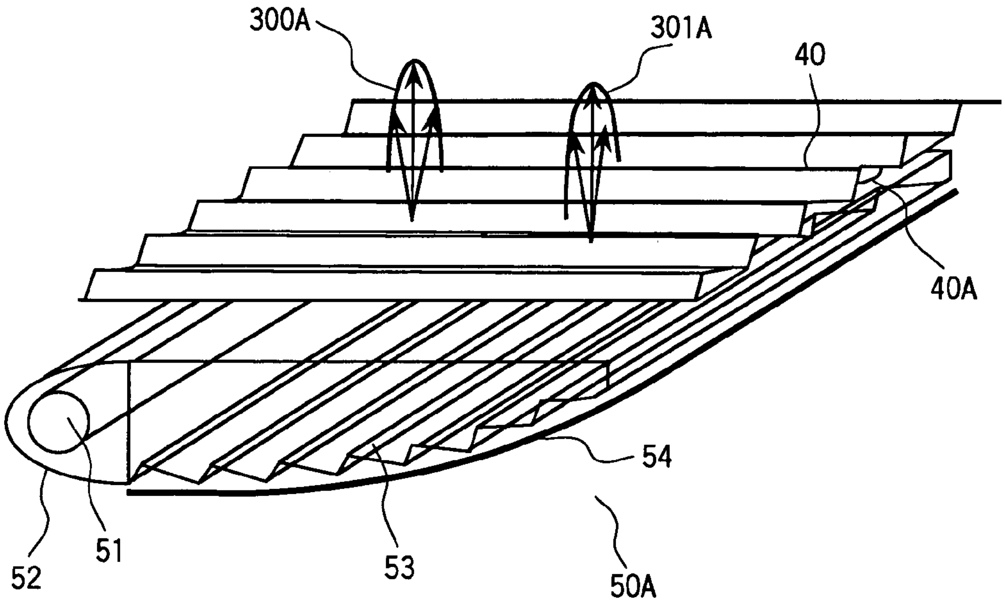
FIG. 22 is a partial, sectional perspective view of the illumination device representing an embodiment of the present invention.

Next, an embodiment of the illumination device having a high uniaxial collimation and collimation at all azimuth angles will be explained. The illumination devices explained hitherto can be used naturally, but another embodiment will be described hereinafter with reference to FIG. 22.

In the illumination device 50A, a lens sheet 40 was used as a light control element having a cross section in the form of stripe shaped triangles on the illumination device 50 to give the device characteristics of directivity in a depth direction of the figure. In accordance with the present embodiment, the apex angle 40A was 90 degrees and the pitch was 50 μm, but the apex angle and the pitch are not restricted to these values. As a result, the directivity was enhanced at all azimuth angles as indicated by the lateral direction projection characteristics 300A and vertical direction projection characteristics 301A, and so the collimation could be improved. The projection characteristics at the time are indicated in FIG. 31, wherein the lateral direction projection characteristics 25D have been widened slightly, and the directivity in the vertical direction projection characteristics 25C has been enhanced. By applying the illumination device 50A to the liquid crystal display device illustrated in FIG. 17, the brightness at a normal angle was improved by the directivity of the light, and the color reproduction depending on the viewing angle was improved by decreasing the oblique incident light in the stripe direction of the reflective color selective layer. At that time, light transmitted through the liquid crystal layer 13 could be widened at all azimuth angles by using the screen indicated in FIG. 2, FIG. 3, and FIG. 4 as the screen 10, whereby the viewing angle characteristics could be improved. In accordance with the present embodiment, the characteristics of no color mixing and a high contrast ratio could be obtained.

Figure 23:
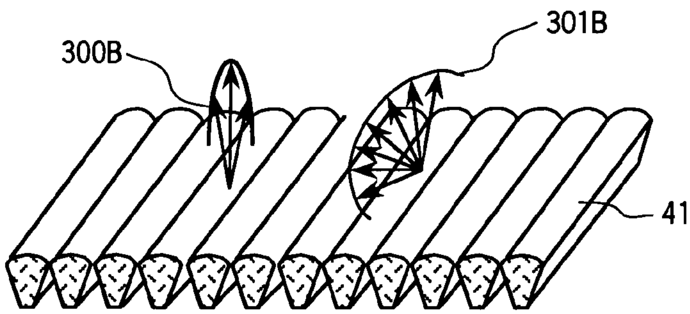
FIG. 23 is a sectional perspective view of the illumination device representing an embodiment of the present invention.
Figure 24:
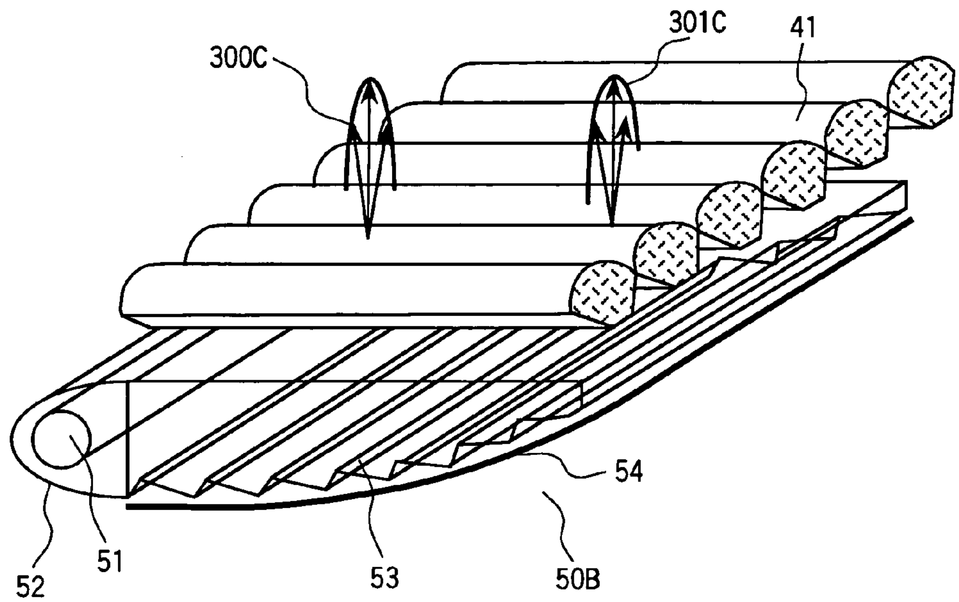
FIG. 24 is a partial, sectional perspective view of the illumination device representing an embodiment of the present invention.

An embodiment of the illumination device 50B is indicated in FIG. 24, wherein the collimating sheet 41 illustrated in FIG. 23 was used instead of the lens sheet. The collimating sheet 41 was made of a transparent acrylic resin having a narrowed bottom portion arranged in a stripe manner, and shape of the pitch was 4 mm, the height was 4 mm, and the bottom length was 1 mm. However, if the collimating sheet has a structure, wherein the bottom portion is narrow and the width is increased as it comes close to the upper portion, the shape is not restricted by the above values. As a result, the light incident to the bottom of the collimating sheet 41 had characteristics such as shown at 300B, wherein the directivity was enhanced only in the lateral direction of the figure, and the light is widened in the depth direction of the figure reflecting the incident light viewing angle characteristics indicated at 301B. The collimating sheet 41 was arranged so that the stripe direction of the sheet intersected perpendicularly with the groove direction of the illuminating device 50, and the waveguide 53 and the collimating sheet 41 were adhered to each other by a transparent medium having approximately the same refractive index. As a result, the light reflected from the declined microgroove portion at the rear plane of the waveguide 53 is projected, and further, even the other light, which would be reflected and propagated in the waveguide 53 when the collimating sheet is not present, is projected out when the light is projected into the bottom plane of the collimating sheet 41. Accordingly, the projection characteristics in the lateral direction 300C are disposed in parallel by the microgrooves at the rear plane of the waveguide 53, and the projection characteristics in the vertical direction 301C are disposed in parallel by the collimating sheet 41. Desirably, the adhered portion of the collimating sheet 41 is not the whole plane of the bottom, but some portions are adhered at intervals in parallel to the microgrooves at the rear plane of the waveguide 53. By applying the illumination device 50B to the liquid crystal display device indicated in FIG. 17, the brightness at a normal angle was improved by the directivity of the light, and the color reproduction depending on the viewing angle was improved by decreasing the oblique incident light in the stripe direction of the reflective color selective layer 70.

Figure 25:
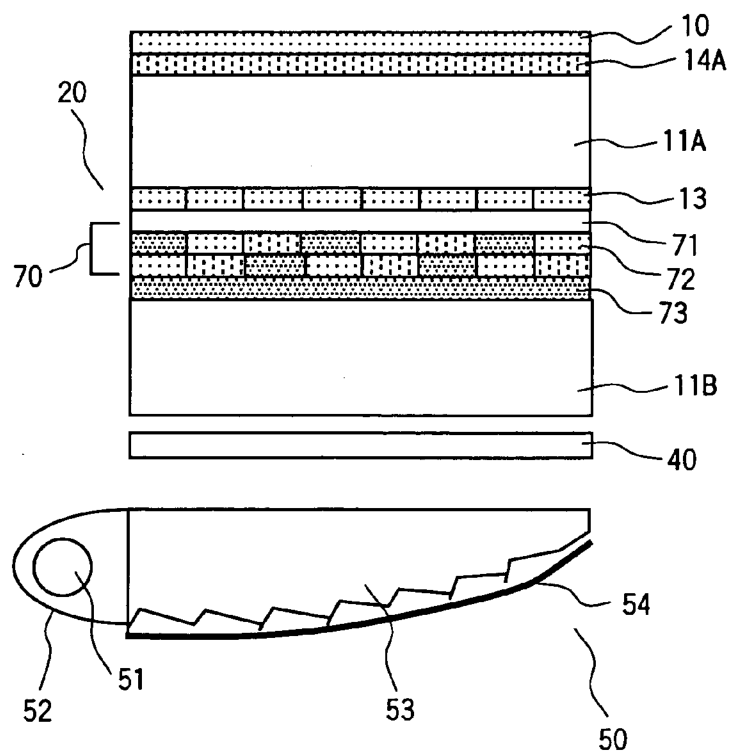
FIG. 25 is a cross section of the liquid crystal display device representing an embodiment of the present invention.

Another embodiment of the liquid crystal display element 20 will be explained hereinafter with reference to FIG. 25.

The same structure as the liquid crystal display element shown in FIG. 18 was used as the illumination device 50. However, any of the other illumination devices described hitherto can be used.

The differences from the embodiment indicated in FIG. 18 are in the arrangement of the reflective color selective layer 70 and the reflective polarizing selective layer 73 at the inside surface of the transparent substrate 11B. The important point of the present embodiment is in the arrangement of the reflective color selective layer 70 between the transparent substrates, and the reflective polarizing selective layer 73 may be arranged at the illumination device side of the transparent substrate 11B, because the adjustment of pixels is not necessary. In FIG. 25, the thickness of the transparent substrates 11A, 11B are the cause of the image to be unclear. That is, if the collimation of the light projected from the illumination device is not desirable, pixels of the reflective color selective layer 70 and the liquid crystal layer 13 will be transmitted through different regions, and the mixing colors and other problems are generated. In accordance with the present embodiment, the influence of the thickness of the transparent substrate 11B can be eliminated, and a clear image can be obtained even if the collimation of the illumination device 50 is not desirable.

Another embodiment of the liquid crystal display element 20 is illustrated in FIG. 26.

The same structure as used the liquid crystal display element of FIG. 18 was used as the illumination device 50. However, any of the other illumination devices described hitherto can be used.

The differences from the embodiment indicated in FIG. 18 are in the arrangement of the absorption type polarizing selective layer 14B between the transparent substrate 14 and the reflective color selective layer 70. The polarizer G1220DU made by Nitto Denko Co. was used as the absorption type polarizing selective layer 14B. In accordance with the present embodiment; cholesteric layers are used as the reflective color selective layer 70 and the reflective polarizing selective layer 73, and the polarization and the viewing angle dependence of the polarized light are inferior in comparison with the absorption type polarizer. Accordingly, by arranging the absorption type polarizer 14B on the reflective polarizing selective layer 73 and the reflective color selective layer 70, unnecessary polarized light from the layer 70 can be absorbed by the absorption type polarizer 14B, and the polarized light characteristics of the transmitted light are improved and the contrast ratio of the display can be improved.

Figure 27:
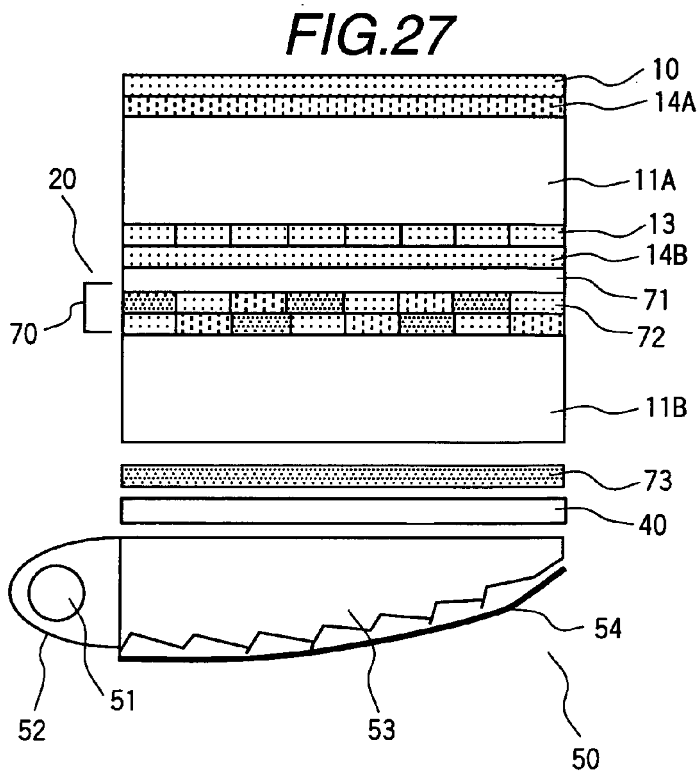
FIG. 27 is a cross section of the liquid crystal display device representing an embodiment of the present invention.

Another embodiment of the liquid crystal display element 20 is shown in FIG. 27.

The same structure as used in the liquid crystal display element of FIG. 26 was used as the illumination device 50. However, any of the other illumination devices described hitherto can be used.

The differences from the embodiment indicated in FIG. 26 are in the arrangement of the absorption type polarizer 14B between the transparent substrate 11B and the reflective color selective layer 70. The polarizer G1220DU made by Nitto Denko Co. was used as the absorption type polarizer 14B. In accordance with the present embodiment, cholesteric layers are used as the reflective color selective layer 70 and the reflective polarizing selective layer 73, and the polarization and the viewing angle dependence of the polarized light are inferior in comparison with the absorption type polarizer. Accordingly, by arranging the absorption type polarizer 14B on the reflective polarizing selective layer 73 and the reflective color selective layer 70, unnecessary polarized light from the layer 70 can be absorbed by the absorption type polarizer 14B, and the polarized light characteristics of the transmitted light are improved and the contrast ratio of the display can be improved. A clearer image could be obtained in comparison with the embodiment illustrated in FIG. 26.

In accordance with the above embodiments, an explanation was presented concerning an arrangement wherein the color filter, i.e. the absorption type color selective means, was eliminated. However, the color filters may be provided in order to improve color purity. The color reproduction of the displayed color can be improved by use of the color filters.

Another embodiment of the screen 10 will be explained hereinafter.

Figure 28:
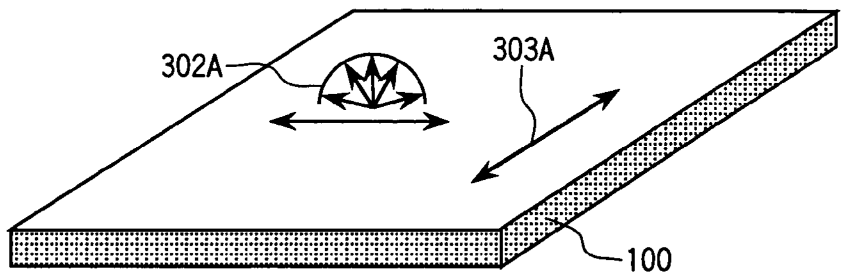
FIG. 28 is a diagram indicating an operation of the screen applied to the liquid crystal display device of the present invention.
Figure 29:
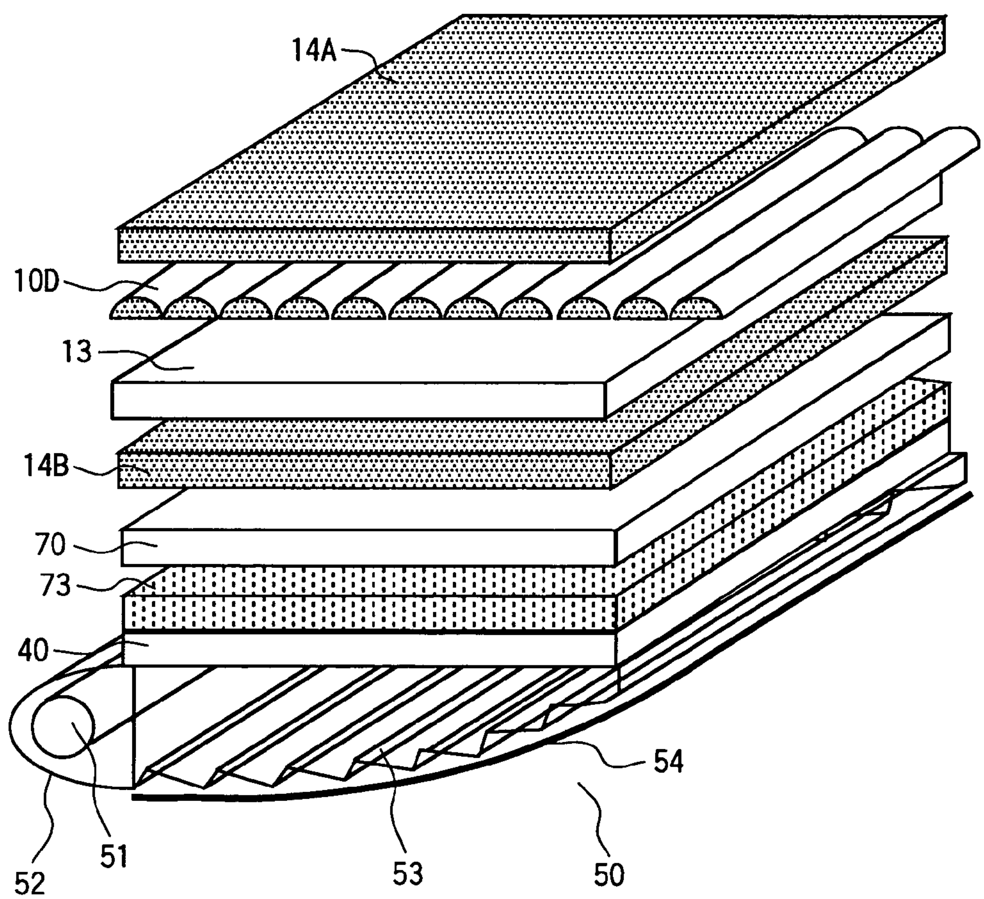
FIG. 29 is an exploded perspective view of the liquid crystal display device representing an embodiment of the present invention.

An example of the characteristics of the screen 10 is indicated in FIG. 28. In the previous embodiment, Lumisty made by Sumitomo Chemical Co. was used in the screen 10 as the uniaxial optical diffusion layer having projection characteristics as indicated at 302A in the lateral direction and as indicated at 303A in the vertical direction. In the present embodiment, a stripe shaped rod lens array (its pitch is approximately 50 μm) as indicated in FIG. 29 was used as the screen 10 D having an uniaxial scattering property. The illumination device 50 used in the present embodiment had a strong directivity of the light in the lateral direction, and a clear display having a wide viewing angle could be realized by widening the projected light provided by the screen 10D operating as a uniaxial scattering layer after the light is transmitted through the liquid crystal layer 13. Desirably, the absorber at the light projection side is arranged as indicated in FIG. 2–FIG. 4.

Hitherto, the embodiments of the liquid crystal display devices, using an illumination device having a high uniaxial collimated light or collimation at all azimuth angles, screen broadening projected light at uniaxial or at all azimuth angles, a reflective polarizer, a light control element, and a reflective color selective means, have been explained. Other combinations of each of the above components are also possible. The display mode of the liquid crystal is not restricted by the above embodiments.

In accordance with the present invention, a liquid crystal display device having a wide viewing angle and a high efficiency of light utilization can be realized by using reflective color selective means, polarizing selective means, a light control element and a screen. The optimum axial arrangement of the light control element and the polarizer, when the light control element is applied in order to improve the brightness at a normal angle, is defined. Improvement of the efficiency of the light utilization and of the brightness at a normal angle can be realized by using a waveguide which is capable of maintaining the polarization of the reflected light from the reflective polarizer and improving the directivity of the light.

Although one of the objects of the present invention is to eliminate the absorption loss by the polarizer and color filters and to improve the efficiency of the light utilization, the present invention can provide color liquid crystal display devices having a high display quality and a wide viewing angle even if the display is viewed from an oblique position by eliminating the deterioration of the display quality (unclearness) caused by the thickness of the glass substrate, which has been a problem in the prior art, and deterioration of the display quality (decrease in contrast ratio, deterioration in displayed color) at an oblique angle.

In accordance with the present invention, liquid crystal display devices which can display with a wide viewing angle and with a low power consumption can be provided.

What is claimed is:

1. A liquid crystal display device comprising:

an illumination device;

a light control element arranged at a projected light side of the illumination device;

a reflective polarizer comprising a cholesteric layer and a quarter wave plate arranged at an upper portion of the light control element so that a polarized light transmission axis of the reflective polarizer is adjusted so as to be substantially perpendicular or substantially parallel to a direction of stripes of the light control element;

a liquid crystal display element for controlling polarization of projected light projected from the reflective polarizer; and a screen arranged at an upper portion of the liquid crystal display element;

wherein the light control element comprises an isotropic medium having no birefringence, and is the only light control element arranged between the illumination device and the reflective polarizer.

2. A liquid crystal display device according to claim 1, wherein the reflective polarizer is arranged so that the polarized light transmission axis of the reflective polarizer is approximately parallel to a major axis direction of a pixel the liquid crystal display element.

3. A liquid crystal display device according to claim 2, wherein the reflective polarizer is composed so as to have a light directivity in a minor axis direction of the pixel; and wherein the screen is composed so as to broaden projected light in the minor axis direction of the pixel.

4. A liquid crystal display device according to claim 3, wherein the screen is composed so as to absorb external light and to transmit the projected light from the illumination device.

5. A liquid crystal display device according to claim 1, further comprising a birefringent medium arranged between the illumination device and the light control element.

6. A liquid crystal display device according to claim 1, wherein the liquid crystal display element includes:

at least a pair of transparent substrates;

a liquid crystal layer interposed between the pair of transparent substrates; and a pair of absorption type polarizers arranged so that the pair of transparent substrates are held between the pair of absorption type polarizers.

7. A liquid crystal display device according to claim 6, further comprising a reflective color selective layer corresponding to the pixel of the liquid crystal display element.

8. A liquid crystal display device according to claim 7, wherein the liquid crystal layer, the reflective polarizer, the absorption type polarizers, and the reflective color selective layer are arranged so that a stripe direction of the reflective color selective layer coincides with an axis in a scattering direction of the screen.

9. A liquid crystal display device according to claim 1, wherein the illumination device includes:

a flat waveguide having a front plane and a rear plane, the front plane of the waveguide constituting a light projecting plane of the waveguide, the rear plane of the waveguide, having numerous depressed planes, protruded planed, or steps, the depressed planes, protruded planes, or steps having respective slightly declined planes;

a light source arranged adjacent to the waveguide; and a reflector arranged at the rear plane of the waveguide, the reflector either contacting the rear plane of the waveguide directly, or being spaced from the rear plane of the waveguide via an air layer;

wherein the waveguide and the light source are composed so that projected light from the light source is propagated in the waveguide and projected from the light projecting plane of the waveguide; and wherein the declined planes of the reflector are mirrors.

10. A liquid crystal display device as claimed in claim 9, wherein the declined planes form stripes on the reflector; and wherein the stripes on the reflector are substantially parallel to a major axis direction of a pixel of the liquid crystal display element.

11. A liquid crystal display device comprising:

an illumination device;

a light control element arranged at a projected light side of the illumination device;

a reflective polarizer comprising a cholesteric layer and a quarter wave plate, arranged at an upper portion of the light control element so that a polarized light transmission axis of the reflective polarizer is adjusted so as to be substantially perpendicular or substantially parallel to a direction of stripes of the light control element;

a liquid crystal display element for controlling polarization of projected light projected from the reflective polarizer so that a major axis direction of a pixel of the liquid crystal display element is arranged approximately parallel to a direction in which a linearly polarized light component of projected light projected from the illumination device is high; and a screen arranged at an upper portion of the liquid crystal display element;

wherein the light control element comprises an isotropic medium having no birefringence, and is the only light control element arranged between the illumination device and the reflective polarizer.

12. A liquid crystal display device according to claim 11, further comprising a birefringent medium arranged between the illumination device and the light control element.

13. A liquid crystal display device according to claim 11, wherein the illumination device includes:

a flat waveguide having a front plane and a rear plane, the front plane of the waveguide constituting a light projecting plane of the waveguide, the rear plane of the waveguide having numerous depressed planes, protruded planes, or steps, the depressed planes, protruded planes, or steps having respective slightly declined planes;

a light source arranged adjacent to the waveguide; and a reflector arranged at the rear plane of the waveguide, the reflector either contracting the rear plane of the waveguide directly, or being spaced from the rear plane of the waveguide via an air layer;

wherein the waveguide and the light source are composed so that projected light from the light source is propagated in the waveguide and projected from the light projecting plane of the waveguide; and wherein the declined planes of the reflector are mirrors.

14. A liquid crystal display device as claimed in claim 13, wherein the declined planes form stripes on the reflector; and wherein the stripes on the reflector are substantially parallel to the major axis direction of the pixel.

15. A liquid crystal display device according to claim 11, further comprising a reflective color selective layer corresponding to a pixel of the liquid crystal display element.

16. A liquid crystal display device according to claim 11, wherein the liquid crystal display element includes:

at least a pair of transparent substrates;

a liquid crystal layer interposed between the pair of transparent substrates; and a pair of absorption type polarizers arranged so that the pair of transparent substrates are held between pair of absorption type polarizers.

* * * * *